United States Patent
Yamagata et al.

(10) Patent No.: US 8,750,348 B2
(45) Date of Patent: *Jun. 10, 2014

(54) METHOD FOR ACQUIRING SATELLITE SIGNAL AND SATELLITE SIGNAL RECEIVING DEVICE

(71) Applicant: Seiko Epson Corporation, Tokyo (JP)

(72) Inventors: Yoshitaka Yamagata, Matsumoto (JP); Norio Teruuchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/895,232

(22) Filed: May 15, 2013

(65) Prior Publication Data

US 2013/0251005 A1    Sep. 26, 2013

Related U.S. Application Data

(63) Continuation of application No. 12/955,824, filed on Nov. 29, 2010, now Pat. No. 8,462,833.

(30) Foreign Application Priority Data

Nov. 30, 2009  (JP) ................................. 2009-271897

(51) Int. Cl.
    *H04B 1/00*      (2006.01)
(52) U.S. Cl.
    USPC ........... 375/150; 375/136; 375/147; 375/260; 375/262; 375/265; 375/267; 375/316; 375/340; 375/343
(58) Field of Classification Search
    CPC ...... H04B 1/709; H04B 1/707; H04B 1/7085; H04B 1/7075; G01S 19/30; H04L 27/2647; H04L 5/0007; H04L 27/2657; H04L 27/2662; H04L 5/0048
    USPC ......... 375/150, 136, 147, 260, 272, 285, 340, 375/316, 367; 370/203, 204, 205, 208, 209, 370/210
    See application file for complete search history.

(56) References Cited

U.S. PATENT DOCUMENTS

| | | | |
|---|---|---|---|
| 7,570,206 B2 | 8/2009 | Uchida | |
| 7,940,209 B2 | 5/2011 | Gobara | |
| 8,005,157 B2 | 8/2011 | Akahori | |
| 2007/0253471 A1 | 11/2007 | Wilhelmsson et al. | |
| 2007/0274374 A1 | 11/2007 | Abraham | |
| 2009/0052506 A1* | 2/2009 | Valio et al. ................. | 375/150 |
| 2009/0262021 A1 | 10/2009 | Uchida | |

FOREIGN PATENT DOCUMENTS

| | | |
|---|---|---|
| JP | 2005-537727 A | 12/2005 |
| JP | 2007-256111 A | 10/2007 |
| JP | 2009-264769 A | 11/2009 |
| WO | 2004/021595 A1 | 3/2004 |

\* cited by examiner

*Primary Examiner* — Dhaval Patel
(74) *Attorney, Agent, or Firm* — Kilpatrick Townsend & Stockton LLP

(57) ABSTRACT

Methods and apparatuses for acquiring a satellite signal includes generating a differential code using first, second and third segments of a satellite signal received from a positioning satellite, obtaining a correlation value by performing a correlation using the differential code and a replica of the spreading code, and acquiring the satellite signal using the correlation value. The differential code is generated by performing a differential operation on a spreading code from the positioning satellite.

10 Claims, 17 Drawing Sheets

| | | | | | | |
|---|---|---|---|---|---|---|
| CA CODE $CA(t)$ | $CA(1)$ | $CA(2)$ | $CA(3)$ | $CA(4)$ | $CA(5)$ | $CA(6)$ ... |
| DIFFERENTIAL-CODECODED CA CODE $w(t)$ | (N/A) | $CA(1) \cdot CA(2)$ | $CA(2) \cdot CA(3)$ | $CA(3) \cdot CA(4)$ | $CA(4) \cdot CA(5)$ | $CA(5) \cdot CA(6)$ ... |
| REPLICA CODE $CA_R(t)$ | $CA_R(1)$ | $CA_R(2)$ | $CA_R(3)$ | $CA_R(4)$ | $CA_R(5)$ | $CA_R(6)$ ... |
| DIFFERENTIAL-CODECODED REPLICA CODE $w_R(t)$ | (N/A) | $CA_R(1) \cdot CA_R(2)$ | $CA_R(2) \cdot CA_R(3)$ | $CA_R(3) \cdot CA_R(4)$ | $CA_R(4) \cdot CA_R(5)$ | $CA_R(5) \cdot CA_R(6)$ ... |
| PRODUCT $g(t) = w(t) \cdot w_R(t)$ | (N/A) | $g(2) = w(2) \cdot w_R(2)$ | $g(3) = w(3) \cdot w_R(3)$ | $g(4) = w(4) \cdot w_R(4)$ | $g(5) = w(5) \cdot w_R(5)$ | $g(6) = w(6) \cdot w_R(6)$ ... |

CORRELATION VALUE $P(\Delta t) = \left( \sum_t g(t) \right)^2 = \left( \sum_t w(t) \cdot w_R(t + \Delta t) \right)^2$

| | | | | | | | |
|---|---|---|---|---|---|---|---|
| CA CODE $CA(t)$ | 1 | -1 | -1 | 1 | 1 | -1 | ... |
| DIFFERENTIAL-CODECODED CA CODE $w(t)$ | (N/A) | -1 | -1 | 1 | 1 | (N/A) | ... |
| REPLICA CODE $CA_R(t)$ | 1 | -1 | -1 | 1 | 1 | -1 | ... |
| DIFFERENTIAL-CODECODED REPLICA CODE $w_R(t)$ | (N/A) | -1 | -1 | 1 | 1 | (N/A) | ... |
| PRODUCT $g(t) = w(t) * w_R(t)$ | (N/A) | 1 | 1 | 1 | 1 | (N/A) | ... |

$$P(\Delta t = 0) = (1+1+1+1)^2 = 16$$

| CA CODE CA(t) | 1 | -1 | -1 | 1 | -1 | 1 | ... |
|---|---|---|---|---|---|---|---|
| DIFFERENTIAL-CODECODED CA CODE w(t) | (N/A) | -1 | 1 | 1 | 1 | (N/A) | ... |
| REPLICA CODE CA$_R$(t) | -1 | 1 | -1 | 1 | 1 | -1 | ... |
| DIFFERENTIAL-CODECODED REPLICA CODE w$_R$(t) | (N/A) | -1 | -1 | 1 | 1 | (N/A) | ... |
| PRODUCT g(t) = w(t) * w$_R$(t) | (N/A) | 1 | -1 | 1 | 1 | (N/A) | ... |

$$P(\Delta t = 1) = (-1 + 1 - 1 + 1)^2 = 0$$

FIG. 3

| CA CODE $CA(t)$ | $CA(1)$ | $CA(2)$ | $CA(3)$ | $CA(4)$ | $CA(5)$ | $CA(6)$ | ... |
|---|---|---|---|---|---|---|---|
| DIFFERENTIAL-CODECODED CA CODE $w(t)$ | (N/A) | $CA(1) \cdot CA(3)$ | $CA(2) \cdot CA(4)$ | $CA(3) \cdot CA(5)$ | $CA(4) \cdot CA(6)$ | $CA(5) \cdot CA(7)$ | ... |
| PREDICTED CA CODE $CA_P(t)$ | $CA_P(1)$ | $CA_P(2)$ | $CA_P(3) = CA_P(1) \cdot CA(1) \cdot CA(3)$ | $CA_P(4) = CA_P(2) \cdot CA(2) \cdot CA(4)$ | $CA_P(5) = CA_P(3) \cdot CA(3) \cdot CA(5)$ | $CA_P(6) = CA_P(4) \cdot CA(4) \cdot CA(6)$ | ... |
| REPLICA CODE $CA_R(t)$ | $CA_R(1)$ | $CA_R(2)$ | $CA_R(3)$ | $CA_R(4)$ | $CA_R(5)$ | $CA_R(6)$ | ... |
| PRODUCT $f(t) = CA_P(t) * CA_R(t)$ | $f(1) = CA_P(1) \cdot CA_R(1)$ | $f(2) = CA_P(2) \cdot CA_R(2)$ | $f(3) = CA_P(3) \cdot CA_R(3)$ | $f(4) = CA_P(4) \cdot CA_R(4)$ | $f(5) = CA_P(5) \cdot CA_R(5)$ | $f(6) = CA_P(6) \cdot CA_R(6)$ | ... |

CORRELATION VALUE $P(\Delta t) = \left( \sum_t f(t) \right)^2 = \left( \sum_t CA_P(t) \cdot CA_R(t + \Delta t) \right)^2$

FIG. 4

| ⟨CA_p(1), CA_p(2)⟩ = (1, 1) Δt=0 | | | | | | | |
|---|---|---|---|---|---|---|---|
| CA CODE CA(t) | 1 | 1 | -1 | -1 | 1 | 1 | ... |
| DIFFERENTIAL-CODECODED CA CODE w(t) | (N/A) | 1 | -1 | 1 | 1 | (N/A) | ... |
| PREDICTED CA CODE $CA_P(t)$ | 1 | 1 | 1 | -1 | -1 | -1 | ... |
| REPLICA CODE $CA_R(t)$ | 1 | 1 | -1 | -1 | 1 | 1 | ... |
| PRODUCT $f(t) = CA_P(t) * CA_R(t)$ | 1 | 1 | -1 | 1 | -1 | -1 | ... |

$$P(\Delta t = 0) = (1-1+1-1+1-1)^2 = 0$$

| | | | | | | | |
|---|---|---|---|---|---|---|---|
| CA CODE CA(t) | 1 | −1 | −1 | 1 | 1 | −1 | 1 | ... |
| DIFFERENTIAL-DECODED CA CODE w(t) | (N/A) | −1 | −1 | 1 | 1 | 1 | (N/A) | ... |
| PREDICTED CA CODE CA$_P$(t) | 1 | −1 | −1 | 1 | 1 | −1 | 1 | ... |
| REPLICA CODE CA$_R$(t) | 1 | 1 | −1 | 1 | 1 | −1 | 1 | ... |
| PRODUCT f(t) = CA$_P$(t) * CA$_R$(t) | 1 | 1 | 1 | 1 | 1 | 1 | 1 | ... |

$$P(\Delta t=0)=(1+1+1+1+1+1)^2=36$$

FIG. 6

| $(CA_p(1), CA_p(2)) = (-1, 1)$ $\Delta t = 0$ | | | | | | | |
|---|---|---|---|---|---|---|---|
| CA CODE $CA(t)$ | 1 | -1 | -1 | -1 | -1 | 1 | ⋮ |
| DIFFERENTIAL-CODECODED CA CODE $w(t)$ | (N/A) | -1 | -1 | 1 | 1 | (N/A) | ⋮ |
| PREDICTED CA CODE $CA_P(t)$ | -1 | 1 | 1 | -1 | 1 | -1 | ⋮ |
| REPLICA CODE $CA_R(t)$ | 1 | -1 | -1 | 1 | -1 | 1 | ⋮ |
| PRODUCT $f(t) = CA_P(t) * CA_R(t)$ | -1 | -1 | -1 | -1 | -1 | -1 | ⋮ |

$$P(\Delta t = 0) = (-1-1-1-1-1-1)^2 = 36$$

FIG. 7

$(CA_p(1), CA_p(2)) = (-1, -1) \quad \Delta t = 0$

| CA CODE CA(t) | 1 | -1 | -1 | 1 | -1 | 1 | ... |
|---|---|---|---|---|---|---|---|
| DIFFERENTIAL-CODECODED CA CODE w(t) | (N/A) | -1 | 1 | 1 | 1 | (N/A) | ... |
| PREDICTED CA CODE $CA_P(t)$ | 1 | -1 | 1 | 1 | 1 | 1 | ... |
| REPLICA CODE $CA_R(t)$ | 1 | -1 | -1 | 1 | -1 | 1 | ... |
| PRODUCT f(t) = $CA_P(t) * CA_R(t)$ | -1 | 1 | -1 | 1 | -1 | 1 | ... |

$P(\Delta t = 0) = (-1+1-1+1-1+1)^2 = 0$

FIG. 8

METHOD FOR ACQUIRING SATELLITE SIGNAL AND SATELLITE SIGNAL RECEIVING DEVICE

This application is a continuation of U.S. patent application Ser. No. 12/955,824, filed Nov. 29, 2010, which claims the priority to Japanese Patent Application No. 2009-271897, filed Nov. 30, 2009, the entire disclosures of which are incorporated by reference herein.

BACKGROUND

1. Field of the Invention

This invention relates to methods for acquiring a satellite signal and satellite signal receiving devices.

2. Description of the Related Art

The Global Positioning System (GPS) is widely known as a satellite positioning system using a GPS satellite signal as a positioning signal, and is utilized in GPS receiving devices for mobile telephones, car navigation systems, or the like. GPS receiving devices generally perform a positioning calculation by calculating a three-dimensional coordinate and a clock error based on locations of GPS satellites and information such as pseudoranges between the GPS receiving devices themselves and GPS satellites.

A GPS satellite signal is a kind of communication signals that are spread-modulated in Code Division Multiple Access (CDMA) method, which has been known as a spread spectrum modulation method. GPS satellite signals are transmitted from GPS satellites on a frequency (carrier frequency) of 1.57542 GHz, which may not coincide with a receiving frequency at a GPS receiving device due to influencing factors such as a Doppler caused by movements of GPS satellites or the GPS receiving device. Hence, the GPS receiving device searches for a frequency to acquire a GPS satellite signal among receiving signals to determine an acquisition frequency.

Disclosed in JP A-2007-256111 is a general method for determining the acquisition frequency, by correlating a received signal and a replica signal of the spread-modulated signal from a GPS satellite while changing frequency and code phase. The method is also referred to as a correlation calculation in the frequency direction and code phase direction, or a frequency search and a code-phase search.

In a correlation calculation in the frequency direction, GPS satellites are moving fast and Doppler effects associated with the movement of the respective satellites can be significant. Such effect of the Doppler frequency may cause large error in the receiving frequency of a GPS satellite signal at the GPS receiving device. Another frequency error may also be caused by a clock error present in a local clock in the GPS receiving device. The GPS receiving device minutely changes frequency to correlate between the received signal and its replica signal within a frequency range accounting for an expected frequency error range. A lot of time is spent in the frequency search, hence the time it takes to acquire a GPS satellite signal is inevitably made longer.

SUMMARY

An advantage of the invention is to provide a method to reduce the time it takes to acquire a satellite signal.

According to a first aspect of the invention, a method for acquiring a satellite signal includes generating a differential code using first, second and third segments of a satellite signal received from a positioning satellite by performing a differential operation on a spreading code from the positioning satellite, obtaining a correlation value by performing a correlation using the differential code and a replica of the spreading code, and acquiring the satellite signal using the correlation value.

As second aspect of the invention, a satellite signal receiving device includes a receiver that receives a satellite signal from a positioning satellite, a differential unit that generates a differential code using the received satellite signal and a delayed signal by performing a differential operation on a spreading code from the positioning satellite, and the delayed signal is the received satellite signal delayed by a selected (e.g., predetermined but selectable) delay time with respect to the received satellite signal, a correlator that obtains a correlation value by performing a correlation using the differential code and a replica of the spreading code, and an acquisition unit that acquires the satellite signal based on the correlation value.

According to the above aspects of the invention, a differential code is generated using first, second and third segments of a satellite signal received from a positioning satellite. The differential code is generated by performing a differential operation on a spreading code from the positioning satellite. The differential code and a replica of the spreading code are correlated to obtain a correlation value. Then the correlation value is used to acquire the satellite signal. In exemplary embodiments, the differential code and the replica code are used in a plurality of correlation operations with different time shifts, or code phase shifts, between the differential code and the replica code. Each of these correlation operations may be performed using the same correlation parameters (e.g., same correlation window, sample counts), in which case the correlation may be referred to as a predefined correlation, a predetermined correlation, or a uniformly-applied correlation over the set of correlations with different time shifts.

A differential code is generable using the first, second and third segments of the satellite signal that has been received, regardless of the frequency of the received signal. Correlating the differential code and the replica and then acquiring the satellite signal based on the correlation value enables the satellite signal acquisition without calculating correlation in the frequency direction. Therefore, the time it takes to acquire the satellite signal is reduced.

A third aspect of the invention is directed to the method of acquiring the satellite signal, in which the second segment of the received signal has a time difference T with respect to the first segment, and the third segment of the received signal has a time difference 2T with respect to the first segment.

According to the third aspect of the invention, a differential code is generated using the first segment of the received signal, the second segment of the received signal having a time difference T with respect to the first segment, and the third segment of the received signal having a time difference 2T with respect to the first segment. For example, using a segment of the received signal (first segment), a segment of the received signal which has been delayed by time T with respect to the first segment (second segment), and a segment of the received signal which has been delayed by time 2T with respect to the first segment (third segment) enables generating easily the differential code, which is generated by performing a differential operation on a spreading code from the positioning satellite.

A fourth aspect of the invention is directed to the method for acquiring the satellite signal, in which generating the differential code may include generating (e.g., calculating) a complex conjugate by squaring the second segment, and generating (e.g., calculating) the differential code by multiplying the first segment, the complex-conjugate and the third segment.

According to the fourth aspect of the invention, a complex conjugate is generated (e.g., calculated) by squaring the second segment. The differential code is calculated by multiplying the first segment, the complex-conjugate and the third segment.

A fifth aspect of the invention is directed to the method for acquiring the satellite signal, which may further include generating a second differential code using the first segment, a fourth segment which has a time difference T' with respect to the first segment, and a fifth segment which has a time difference 2T' with respect to the first segment, obtaining a second correlation value by performing a correlation using the second differential code and the replica of the spreading code, and acquiring the satellite signal using the correlation value and the second correlation value, in which T and T' are different.

According to the fifth aspect of the invention, the second differential code is generated using the first segment, the fourth segment which has the time difference T' with respect to the first segment, and the fifth segment which has the time difference 2T' with respect to the first segment. Then the satellite signal is acquired based on the correlation value and a second correlation value obtained by correlating the second differential code and the replica code. The differential code, which is generated using the second and third segments of the received signal, and the second differential code, which is generated using the fourth and the fifth segment of the received signal, are used in the correlation calculations to obtain the correlation values that are independent from each other. The obtained correlation values are utilized to acquire the satellite signal with improved accuracy.

A sixth aspect of the invention is directed to the method for acquiring the satellite signal, in which the obtaining the correlation value may include generating a differential replica by performing a differential operation on the replica of the spreading code, and correlating a differential code and the differential replica.

According to the sixth aspect of the invention, a differential replica is generated by performing a differential operation and is then correlated with the differential code. The differential code is generated by performing a differential operation on a spreading code from the positioning satellite, and the differential replica is generated by performing a differential operation on a replica code. Multiplying the differential code and the differential replica, enables obtaining the correlation value with improved accuracy.

A seventh aspect of the invention is directed to the method for acquiring the satellite signal, in which the replica of the spreading code includes a first segment of the replica and a second segment of the replica having the time difference 2T with respect to the first segment of the replica, and obtaining the correlation value may include generating a differential replica by multiplying the first segment of the replica and the second segment of the replica, and correlating the differential code and the differential replica.

According to the seventh aspect of the invention, the differential replica is generated by multiplying the first segment of the replica and the second segment of the replica having the time difference 2T with respect to the first segment of the replica. The differential code and the differential replica are then correlated.

An eighth aspect of the invention is directed to the method for acquiring the satellite signal, in which obtaining the correlation value may include predicting a predicted spreading code based on the differential code, and correlating the predicted spreading code and the replica of the spreading code.

According to the eighth aspect of the invention, the differential code is used to predict its spreading code. The predicted code, which is a predicted spreading code, is then correlated with the differential replica. Accurately predicting the predicted spreading code based on the differential code brings higher accuracy in the correlation calculation between the predicted code and the differential replica.

A ninth aspect of the invention is directed to the method for acquiring the satellite signal, which may further include searching a peak correlation by performing a correlation while changing phase of the satellite signal, in which acquiring the satellite signal may include acquiring the satellite signal based on the peak correlation for the phase, without a search for a peak correlation while changing frequency.

According to the ninth aspect of the invention, the peak correlation is searched by performing a correlation calculation while changing phase of the satellite signal. The acquisition of the satellite signal is processed based on the peak correlation, without searching a peak correlation while changing frequency. The correlation value obtained by correlating the differential code and the replica is equivalent to a correlation value obtainable by conducting a frequency search on the received signal. The search in the frequency direction is no longer necessary, and hence the time taken to search in the frequency direction also is no longer necessary.

These and other aspects of the invention are described in greater detail in the Detailed Description Section provided below.

BRIEF DESCRIPTION OF THE DRAWINGS

The invention will be described with reference to the accompanying drawings, wherein like numbers reference like elements.

FIG. 1 is an explanatory drawing explaining a principle of acquiring a GPS satellite signal.

FIG. 2 is an explanatory drawing explaining a principle of acquiring a GPS satellite signal.

FIG. 3 is an explanatory drawing explaining a principle of acquiring a GPS satellite signal.

FIG. 4 is an explanatory drawing explaining a principle of acquiring a GPS satellite signal.

FIG. 5 is an explanatory drawing explaining a principle of acquiring a GPS satellite signal.

FIG. 6 is an explanatory drawing explaining a principle of acquiring a GPS satellite signal.

FIG. 7 is an explanatory drawing explaining a principle of acquiring a GPS satellite signal.

FIG. 8 is an explanatory drawing explaining a principle of acquiring a GPS satellite signal.

DETAILED DESCRIPTION OF EXEMPLARY EMBODIMENTS

Figure 9:
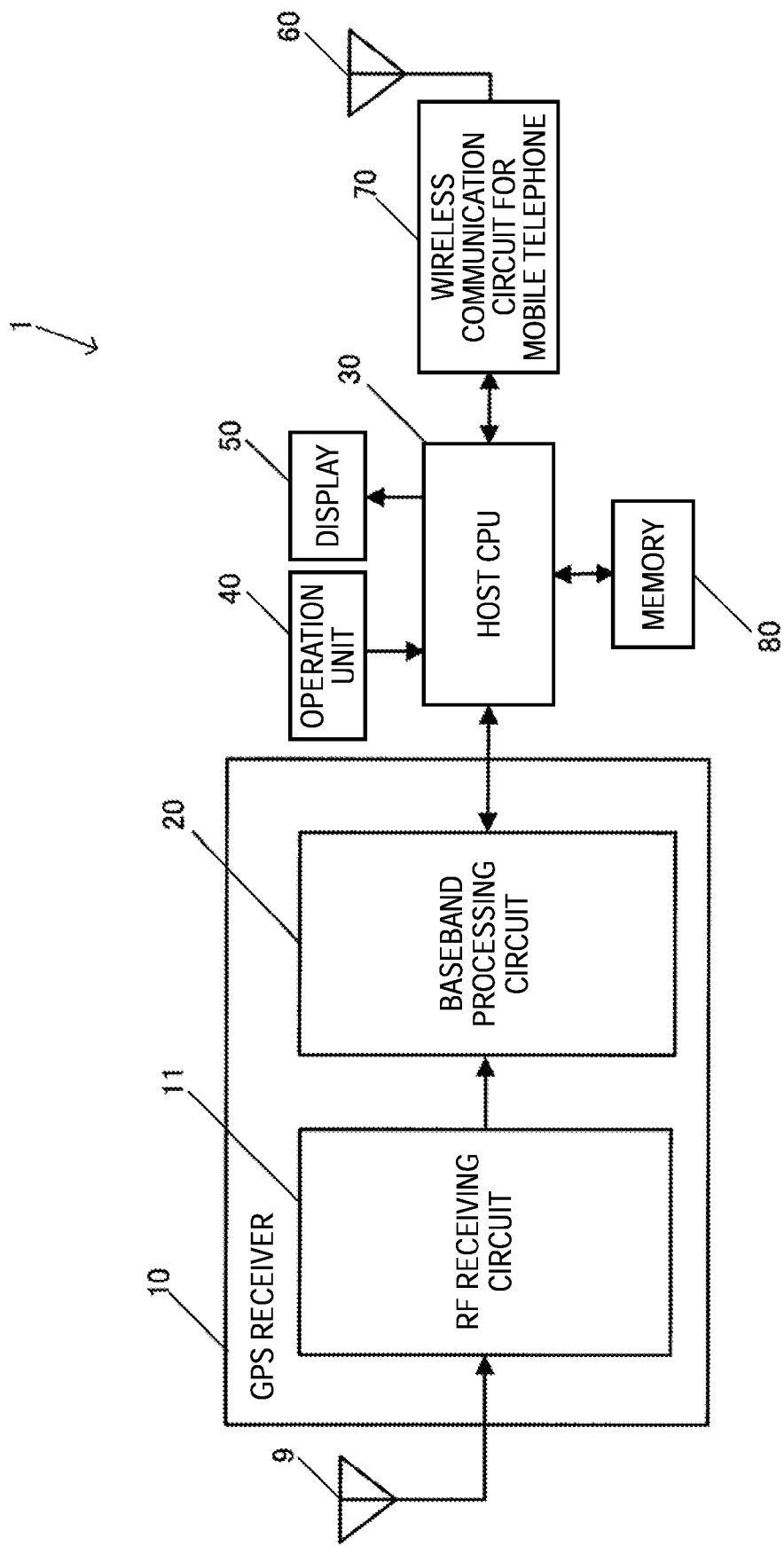
FIG. 9 is a block diagram illustrating a functional configuration of a mobile telephone.

An exemplary embodiment of the invention will be described with reference to the accompanying drawings. Hereinafter described is a Global Positioning System (GPS) receiving device (also referred to as a satellite receiving device or a GPS receiver) that receives a GPS satellite signal transmitted from a GPS satellite and acquires the GPS satellite signal. It should be appreciated that the following description of the preferred embodiment with certain limitations is not intended to limit the scope of the invention unless any limitation on the invention is specified.

1. PRINCIPLE

A principle of a GPS satellite acquisition processing, or a method for acquiring a GPS satellite signal, executed by a GPS receiving device is described below. The GPS satellite network is operated as one of different kinds of positioning satellites. On each of the six Earth satellite orbits, four or more GPS satellites are located in an optimal geometric arrangement so that at least four GPS satellites are theoretically in view of any point on the Earth surface at any time.

A GPS satellite broadcasts a navigation message including the almanac and ephemeris on a GPS satellite signal. A GPS satellite signal is a communication signal modulated on the frequency of 1.57542 GHz according to a spread spectrum modulation method known as Code Division Multiple Access (CDMA) method using a Coarse and Acquisition (CA) code, which is a type of spreading codes. Each GPS satellite is assigned with a unique CA code, which is a pseudorandom noise code having a code length of 1023 chips in a single PN frame that repeats every 1 ms.

A GPS satellite signal is transmitted from a GPS satellite on the frequency of 1.57542 GHz (carrier frequency); however, a receiving frequency at a GPS receiving device may not always coincide with the carrier frequency due to the Doppler effect caused by the movement of the GPS satellite and/or the GPS receiving device. Hence, conventional GPS receiving devices perform a frequency search and a code phase search to acquire a GPS signal among receiving signals. The frequency search is a correlation calculation in the frequency direction, or to put it in another way, a search by changing the frequency to repeatedly perform a correlation calculation for the frequency. The code phase search is a correlation calculation in the code phase direction, or to put it in another way, a search by changing the code phase to repeatedly perform a correlation calculation for the code phase. Since the invention relates in particular to the frequency search, the frequency search is further described below.

For example, in a case where the Doppler affects a receiving frequency within ±5 kHz of the center carrier frequency, a frequency search within ±5 kHz of 1.57542 GHz is conducted while minutely changing the frequency in a unit of 100 Hz, as one example. As such, the frequency search needs to be conducted exhaustively within the frequency range accounting for expected frequency error, causing an acquisition of the GPS satellite signal to take much longer time due to considerable amount of calculations involved.

In order to solve the problem described above, the inventor has come up with a new method to acquire a GPS satellite signal in a shorter period of time with the Doppler shift remaining unknown, without conducting such an exhaustive search. Different variables appear in the below description. A value of an example variable "A" at a time "t" is denoted "A(t)". A search in the code phase direction needs to be conducted in the usual manner.

A received signal "r(t)" received by the GPS receiving device at a time "t" is represented as the equation (1) below.

$$r(t) = I(t) + iQ(t) \quad (1)$$
$$= CA(t) \cdot e^{i\omega t}$$

In the equation 1, "I(t)" and "Q(t)" respectively indicate I and Q components of the received signal "r(t)". Specifically, "I(t)" indicates an in-phase component (real part), and "Q(t)" indicates a quadrature component (imaginary part) of the received signal "r(t)". A CA code of a GPS satellite signal is denoted "CA(t)", which takes a value of either "+1" or "−1". A carrier wave that carries the GPS satellite signal is denoted "$e^{i\omega t}$".

In the equation 1, "ω" is frequency of the received signal, represented as the equation (2).

$$\omega = \omega_c + \omega_d \quad (2)$$

The carrier frequency of the GPS satellite signal is denoted "$\omega_c$", and the Doppler frequency is denoted "$\omega_d$".

Squaring the both sides of the equation (1) gives the equation (3).

$$r(t)^2 = CA(t)^2 \cdot e^{2i\omega t} \quad (3)$$
$$= e^{2i\omega t}$$

A mathematical characteristic of "$CA(t)^2=1$", because "CA(t)" takes either "+1" or "−1", is utilized here.

Then, generating (e.g, calculating) a complex conjugate (reversing signs of the imaginary part of a complex number) of the equation (3) gives the equation (4).)

$$\{r(t)^2\}^* = e^{-2i\omega t} \quad (4)$$

The complex conjugate is represented by the symbol "*".

Multiplying a late value of the received signal "r(t−T)", which is delayed by a selected (e.g., predetermined but selectable) time period T with respect to the received signal "r(t)", with an early value of the received signal "r(t+T)", which is advanced by the selected time period T with respect to the received signal "r(t)", gives the equation (5).

$$r(t-T) \cdot r(t+T) = \quad (5)$$
$$CA(t-T) \cdot e^{i\omega(t-T)} \cdot CA(t+T) \cdot e^{i\omega(t+T)} = CA(t-T) \cdot CA(t+T) \cdot e^{2i\omega t}$$

In this aspect of the invention, when sampling a CA code consisting of a sequence of 1023 chips, a sampling time interval is referred to as a "clock", and the time elapsed on one clock is denoted "T". A time interval of sampling, which is an elapsed time T, may be a time interval of one chip, or a time interval of a fragment in one chip (e.g, a fraction of one chip, such as ½ of a chip, ¼ of a chip, etc.).

Utilizing the equations (4) and (5) gives the equation (6).

$$w(t) = CA(t-T) \cdot CA(t+T) \quad (6)$$
$$= r(t-T) \cdot r(t+T) \cdot e^{-2i\omega t}$$
$$= r(t-T) \cdot r(t+T) \cdot \{r(t)^2\}^*$$

In the equation (6), "w(t)" is a code represented by a product of a CA code "CA(t−T)" delayed by 1 clock with respect to the CA code "CA(t)" and a CA code "CA(t+T)" advanced by 1 clock with respect to the CA code "CA(t)". In this aspect of the invention, a code denoted "w(t)" is referred to as a "differential CA code".

Referring to the equation (6), the differential CA code "w(t)" is represented by a product of different signals "r(r−T)", "r(r+T)" and "$\{r(t)^2\}^*$" having different timings. That means that a differential signal is generable simply by using the received signal ("r(t+T)" in the equation (6)), a first late signal ("$\{r(t)^2\}^*$" in the equation (6)) which is delayed by 1 clock (time "T") with respect to the received signal, and a second late signal ("r(t−T)" in the equation (6)) which is delayed by 2 clocks (time "2T") with respect to the received signal.

A notable point is where a term "$e^{-2i\omega t}$" that includes the frequency of the received signal "ω" is replaced with "$\{r(t)^2\}^*$", which is a signal of complex conjugate of the squared received signal. Hence, performing a correlation process using the differential CA code "w(t)" brings an effect as if a frequency search in the frequency direction has been fully conducted to enable an acquisition of the GPS satellite signal, independent of the frequency of the received signal "ω". In other words, regardless of the value of the Doppler frequency "$\omega_d$", a correlation calculation in the frequency direction is no longer necessary and only a correlation calculation in the code phase direction is needed.

In the above description, although "$\omega_d$" has been described to represent a Doppler frequency, "$\omega_d$" may include any type of frequency errors besides the Doppler frequency. For example, frequency error resulted from a clock error contained in a local clock of the GPS receiver may be included. That is because the GPS satellite signal is thus capturable without a frequency search in the frequency direction, regardless of what value "$\omega_d$" may have.

The inventor has come up with two different methods to acquire a GPS satellite signal using the differential CA code "w(t)" as described above. The two methods are hereinafter described in detail.

1-1. A Method of Differential Operation on a Replica Signal

A first method is generating a differential replica code "$w_R(t)$" to calculate correlation between a differential CA code "w(t)" and the differential replica code "$w_R(t)$".

FIG. 1 is an explanatory drawing explaining a principle of the first method for acquiring a GPS signal. FIG. 1 has a table indicating various codes in time-series change. The top row is for a CA code "CA(t)", the second row is for a differential CA code "w(t)", the third row is for a replica code "$CA_R(t)$", the fourth row is for a differential replica code "$w_R(t)$", and the last row is for a product "g(t)" of the differential CA code "w(t)" and the differential replica code "$w_R(t)$".

Firstly, a differential replica code "$w_R(t)$" is generated (e.g., calculated) according to the equation (7) using "$CA_R(t-T)$", which is a replica code at a time "t−T", and "$CA_R(t+T)$", which is a replica code at a time "t+T".

$$w_R(t) = CA_R(t-T) \cdot CA_R(t+T) \quad (7)$$

The differential CA code "w(t)" and the differential replica code "$w_R(t+\Delta t)$" are correlated while changing "Δt", which is code phase of the differential replica code "$w_R(t)$". In this aspect of the invention, the phase of the replica code is denoted "Δt".

Specifically, a correlation value "P(Δt)" is generated (e.g., calculated) according to the equation (8).

$$P(\Delta t) = \left(\sum_t g(t)\right)^2 = \left(\sum_t w(t) \cdot w_R(t+\Delta t)\right)^2 \quad (8)$$
$$= \left(\sum_t CA(t-T) \cdot CA(t+T) \cdot CA_R(t-T+\Delta t) \cdot CA_R(t+T+\Delta t)\right)^2$$

A value "g(t)" is a product of "w(t)", which is the differential CA code at time "t", and "$w_R(t+\Delta t)$", which is the differential replica code. A correlation value generated (e.g., calculated) for the code phase "Δt" is denoted "P(Δt)".

Then the correlation value "P(Δt)" is generated (e.g., calculated) while changing code phase "Δt" of the differential replica code "$w_R(t)$" to detect the code phase "Δt" in which the correlation value P(Δt) shows the maximum value. The detected code phase "Δt" is determined to be the code phase for this particular GPS satellite signal.

A specific example of the first method is now described with reference to the FIG. 2 and FIG. 3. This example illustrates a case where a time-series change in a CA code of a received signal is represented as "CA(t)=1, −1, −1, 1, −1, 1, ... ". Assumed herein is that the CA code of the target GPS satellite is known, and that a time-series change in its replica code is also represented as "CA(t)=1, −1, −1, 1, −1, 1, ... "

(i) When "Δt=0" chips stands true for a code phase for the replica code

FIG. 2 is an example of calculation results when "Δt=0" chips stands true for a code phase for the replica code. Generating a differential CA code "w(t)" according to the equation (6) using "CA(t−1)" and "CA(t+1)" gives "w(t)=(N/A), −1, −1, 1, 1, (N/A), ... ". Because the head and tail values of the CA code are not identified in FIG. 1, where it is indicated as "(N/A)" is unidentifiable.

Generating the differential replica code "$w_R(t)$" according to the equation (7) using "$CA_R(t-1)$" and "$CA_R(t+1)$" gives "$w_R(t)$=(N/A), −1, −1, 1, 1, (N/A), ... ".

Then, multiplying the differential CA code "w(t)" and the differential replica code "$w_R(t)$" gives a product of "g(t)=(N/A), 1, 1, 1, 1, (N/A), ... ". In this case for example, generating a correlation value "P (Δt=0)" using only the values "g(2)" to "g(5)" gives a correlation value of "P(Δt=0)=(1+1+1+1)²= 16", which is a high value. That is because, as is apparent from FIG. 2, the code phase for the CA code "CA(t)" and the code phase for the replica code "$CA_R(t-1)$" exactly coincide with each other to give a product "g(t)" in a series of "1"s.

(ii) When "Δt=1" chip stands true for a code phase for the replica code

FIG. 3 is a calculation result when "Δt=1" chip stands true for code phase for the replica code. Similarly to (i) above, generating "$w_R(t)$" gives "$w_R(t)$=(N/A), 1, −1, −1, 1, (N/A), ... ". In this case for example, generating a correlation value "P(Δt=1)" using only the values "g(2)" to "g(5)" gives the correlation value of "P(Δt=1)=(−1+1−1+1)²=0", which is low. That is because, as is apparent from FIG. 3, the code phase for the CA code "CA(t)" and the code phase for the replica code "$CA_R(t-1)$" do not match and thus they return a product "g(t)" in "−1"s and "1"s which cancel out each other.

The examples illustrated here represent only two cases where (i) Δt=0 and (ii) Δt=1 stand true, but regardless of what change is made to the code phase "Δt" in a correlation calculation, any resulted correlation value "P(Δt)" will not be greater than the correlation value "P(Δt=0)" when (i) Δt=0 stands true. That is because a product "g(t)" will contain "−1" and "1" that cancel out each other when the code phases do not coincide with each other. Hence, generating (e.g., calculating) correlation value "P(Δt)" while changing code phase "Δt" and then detecting the code phase "Δt" in which the correlation value "P(Δt)" shows the maximum value enables a detection of the true code phase.

1-2. A Method for Predicting a CA Code from a Differential CA Code "w(t)"

The second method is to predict or estimate a CA code of a received signal from a differential CA code "w(t)" to generated (e.g., calculate) a correlation value by performing a correlation calculation using the predicted CA code "$CA_P(t)$".

FIG. 4 is an explanatory drawing explaining the second method. In the table of FIG. 4, the top row is for a CA code of a received signal "CA(t)", the second row is for a differential CA code "w(t)", the third row is for a predicted CA code "$CA_P(t)$", the fourth row is for a replica code of the CA code "$CA_R(t)$", and the last row is for a product of the predicted CA codes and the replica codes "$f(t)=CA_P(t)\cdot CA_R(t)$".

Firstly, a CA code of a received signal is predicted using a prediction process using a time-series change in a differential CA code "w(t)". Specifically, a predicted CA code at a time "1" chip ("$CA_P(1)$") and a predicted CA code at a time "2" chips ("$CA_P(2)$") are combined to set four combinations $\{(CA_P(1), CA_P(2))=(1, 1), (1, -1), (-1, 1), (-1, -1)\}$.

For each of the four combinations, a value resulting from a product of the predicted CA code "$CA_P(t)$" and the differential CA code "w(t+1)=CA (t)·CA(t+2)" is made to be the predicted CA code "$CA_P(t+2)$", generated (e.g., calculated) in an orderly manner starting from the time "1" to obtain the predicted CA code "$CA_P(t)$" at the time "t". Specifically, the predicted CA code "$CA_P(t)$" is generated in the sequential manner; "$CA_P(3)=CA_P(1)\cdot w(2)$", "$CA_P(4)=CA_P(2)\cdot w(3)$", $CA_P(5)=CA_P(3)\cdot CA_P(4)$", ....

The CA code is predicted according to the equation "$CA_P(t+2)=CA_P(t)\cdot w(t+1)=CA_P(t)\cdot CA(t)\cdot CA(t+2)$". That is based on the logic that "$CA_P(t)=CA(t)$" and "$CA_P(t)\cdot CA(t)=1$" stand true when the prediction of the CA code is correct, and the above equation takes a form "$CA_P(t+2)=CA(t+2)$" to show that the CA code and the predicted CA code are equal.

In this case, generating (e.g., calculating) the predicted CA code "$CA_P(t)$" for each of the four combinations results in an exact match between the CA code of the received signal "CA(t)" and the predicted CA code "$CA_P(t)$" generated for one of the four combinations. However, which of the four combinations is correct is unknown because the CA code "CA(t)" is yet unknown.

Now, the predicted CA code "$CA_P(t)$" for each of the four combinations is correlated with the replica code "$CA_R(t)$". In other words, a correlation calculation is performed on the predicted CA code "$CA_P(t)$" while changing code phase "Δt" of the replica code "$CA_R(t)$".

Specifically, a correlation value "P(Δt)" is generated (e.g., calculated) according to the equation (9).

$$P(\Delta t) = \left(\sum_t f(t)\right)^2 \left(\sum_t CA_P(t)\cdot CA_R(t+\Delta t)\right)^2 \qquad (9)$$

In the equation (9), "f(t)" is a product of the predicted CA code "CA(t)" and the replica code "$CA_R(t+\Delta t)$".

After obtaining the correlation value "P(Δt)" while changing code phase "Δt" of the replica code "$CA_R(t)$", a detection of the code phase "Δt" in which the correlation value "P(Δt)" shows the maximum value follows. The detected code phase "Δt" is determined to be the code phase of the GPS satellite signal.

A specific example of the second method is described with reference to the FIGS. 5 to 8. This example illustrates a case where a time-series change in a CA code of a received signal is represented as "CA(t)=1, −1, −1, 1, −1, 1, . . . ". For purposes of simplicity, assumed herein is that "Δt=0" stands true for the code phase of the replica code "$CA_R(t)$", and that a time-series change in the replica code is represented as "$CA_R(t)=1, -1, -1, 1, -1, 1, \ldots$".

(A) Combination $(CA_P(1), CA_P(2))=(1, 1)$

FIG. 5 shows a calculation result of the combination $(CA_P(1), CA_P(2))=(1, 1)$. A differential CA code "w(t)" based on the received signal "r(t)" is generated according to the equation (6). As a result, "w(t)=(N/A), −1, −1, 1, 1, (N/A), . . . " is obtained.

A predicted CA code "$CA_P(t)$" is generated using "$(CA_P(1), CA_P(2))=(1, 1)$". Specifically, the predicted CA code "$CA_P(t)$" is generated in such a sequential manner as in "$CA_P(3)=CA_P(1)\cdot w(2)=-1$", "$CA_P(4)=CA_P(2)\cdot w(3)=-1$", "$CA_P(5)=CA_P(3)\cdot w(4)=-1$", "$CA_P(6)=CA_P(4)\cdot w(5)=-1$", which gives "$CA_P(t)=1, 1, -1, -1, -1, -1, \ldots$" as a result.

Then the predicted CA code "$CA_P(t)$" and the replica code "$CA_R(t)$" are correlated. Specifically, a product "f(t)" is generated in a sequential manner as in "$f(1)=CA_P(1)\cdot CA_R(1)=1$", "$f(2)=CA_P(2)\cdot CA_R(2)=-1$", "$f(3)=CA_P(3)\cdot CA_R(3)=1$", "$f(4)=CA_P(4)\cdot CA_R(4)=-1$", "$f(5)=CA_P(5)\cdot CA_R(5)=1$", "$f(6)=CA_P(6)\cdot CA_R(6)=-1$", which gives "f(t)=1, −1, 1, −1, 1, −1, . . . " as a result.

Based on the result, a correlation value "P(Δt=0)" is generated (e.g., calculated). In this case for example, generating the correlation value "P(Δt=0)" using only the values "f(1)" to "f(6)" gives the correlation value of "$P(\Delta t=0)=(1-1+1-1+1-1)^2=0$". Because the respective products "f(t)" alternately contain "1" and "−1", the resulted correlation value is small.

Obtaining a small correlation value "P(Δt=0)" means that the prediction of the CA code "$CA_P(t)$" has not been correct. As seen in FIG. 5, the comparison of the predicted CA code "$CA_P(t)$" and the actual CA code "CA(t)" shows that the CA code has not been predicted correctly.

(B) Combination $(CA_P(1), CA_P(2))=(1, -1)$

FIG. 6 shows a result of the calculation based on the combination $(CA_P(1), CA_P(2))=(1, -1)$. Similarly to the above (A), a predicted CA code "$CA_P(t)$" is generated using the combination $(CA_P(1), CA_P(2))=(1, -1)$. The calculation gives "$CA_P(t)=1, -1, -1, 1, -1, 1, \ldots$" as a result.

Next, generating a product "f(t)" of the predicted CA code "$CA_P(t)$" and a replica code "$CA_R(t)$" gives "f(t)=1, 1, 1, 1, 1, 1, . . . ". For example, generating a correlation value "P(Δt=0)" using only the values "f(1)" to "f(6)" gives a correlation value of "$P(\Delta t=0)=(1+1+1+1+1+1)^2=36$". As is apparent in this example, the respective products "f(t)" are all "1"s to result in a large correlation value "P(Δt=0)."

Having resulted in a large correlation value "P(Δt=0)" means that the CA code "$CA_P(t)$" has been predicted correctly. The comparison of the predicted CA code "$CA_P(t)$" and the actual CA code "CA(t)" in FIG. 6 shows that the CA code has been correctly predicted.

(C) Combination $(CA_P(1), CA_P(2))=(-1, 1)$

FIG. 7 shows a result of the calculation based on the combination $(CA_P(1), CA_P(2))=(-1, 1)$. Calculating a predicted CA code "$CA_P(t)$" using the combination $(CA_P(1), CA_P(2))=(-1, 1)$ gives "$CA_P(t)=-1, 1, 1, -1, 1, -1, \ldots$".

Then generating a product "f(t)" of the predicted CA code "$CA_P(t)$" and a replica code "$CA_R(t)$" gives "f(t)=−1, −1, −1, −1, −1, −1, . . . ". Similarly in this example, generating a correlation value "P(Δt=0)" gives "P(Δt=0)=$(-1-1-1-1-1-1)^2=36$". As is apparent in this example, the respective products "f(t)" are all "−1"s, which makes a correlation value "P(Δt=0)" large.

The calculation has returned a large correlation value, meaning that the CA code "$CA_P(t)$" has been predicted correctly. The comparison between the CA code "CA(t)" and the predicted CA code "$CA_P(t)$" in FIG. 7 shows that all signs are reversed. In GPS, the polarity of the navigation message superimposed on GPS satellite signals could change every 20 ms, and hence, the polarity of the CA code of the received signal could also change every 20 ms due to the polarity reversal in the navigation message. Therefore, if the difference between the CA code "CA(t)" and the predicted CA code "$CA_P(t)$" is observed in the all-reversed signs, it is reasonable to conclude that the prediction has been made correctly.

(D) Combination $(CA_P(1), CA_P(2))=(-1, -1)$

FIG. 8 shows a result of the calculation based on the combination $(CA_P(1), CA_P(2))=(-1, -1)$. Generating a predicted CA code "$CA_P(t)$" using the combination $(CA_P(1), CA_P(2))=(-1, -1)$ gives "$CA_P(t)=-1, -1, 1, 1, 1, 1, \ldots$".

Then generating a product "f(t)" of the predicted CA code "$CA_P(t)$" and a replica code "$CA_R(t)$" gives "f(t)=−1, 1, −1, 1, −1, 1, . . . ". For example, generating a correlation value "P(Δt)" using only the values "f(1)" to "f(6)" gives "P(Δt=0)=$(-1+1-1+1-1+1)^2=0$". In this case, because the respective products alternately contain "1"s and "−1"s, the resulted correlation value "P(Δt=0)" is small.

Having resulted in a small correlation value means that the prediction of the CA code "$CA_P(t)$" using a differential CA code "w(t)" has not been correct. As can be seen in FIG. 8, the comparison of the predicted CA code "$CA_P(t)$" and the actual CA code "CA(t)" shows that the CA code has not been predicted correctly.

Based on the results above, detecting the code phase in which a correlation value shows the maximum value in either the case (B) or (C) enables to detect the code phase correctly. Therefore, for each of the combinations (A) to (D), a process for generating (e.g., calculating) a correlation value "P(Δt)" while changing code phase of the replica code "Δt" and detecting the code phase "Δt", in which the correlation value "P(Δt)" shows the maximum value, is performed.

Given the results above, the combinations (A) and (D) return the same result and the combinations (B) and (C) return the same result, despite the difference in the signs. Hence, the correlation calculation for all the four combinations is not necessary, and performing the correlation calculation for a combination of (A) and (B) or for a combination of (C) and (D) will suffice.

2. EMBODIMENT

An embodiment of a GPS receiving device utilizing the principle above is hereinafter described. In the description below, a mobile telephone 1 is used as a specific example of an electronic device having the GPS receiving device.

2-1. First Embodiment

The first embodiment describes an example to which the above-described principle "1-1. A method of differential operation on a replica code" is applied.

Configuration

FIG. 9 is a block diagram showing a functional configuration of the mobile telephone 1 in the first embodiment. The mobile telephone 1 is configured to include a GPS antenna 9, a GPS receiver 10, a host central processing unit (host CPU) 30, an operation unit 40, a display 50, an antenna for mobile telephone 60, a wireless communication circuit for mobile telephone 70, and a memory 80.

The GPS antenna 9 is an antenna that receives a radio frequency (RF) signal that includes a GPS satellite signal transmitted from a GPS satellite. The received signal is output to the GPS receiver 10.

The GPS receiver 10 is a position-calculating circuit that calculates a position of the mobile telephone 1 based on the signal output from the GPS antenna 9. The GPS receiver 10 is the functional block corresponding to the GPS receiving device. The GPS receiver 10 is configured to include a radio frequency (RF) receiving circuit 11 and a baseband processing circuit 20. The RF receiving circuit 11 and the baseband processing circuit 20 may be manufactured as separate LSIs (Large-Scale Integration) or as a single chip.

The RF receiving circuit 11 (also referred to as a receiver) is a processing circuit block for RF signals, which divides or multiplies a predetermined oscillation signal (e.g., an oscillation signal having a selectable, but substantially fixed, oscillation frequency) to generate an oscillation signal for RF signal multiplication. The generated oscillation signal is multiplied with the RF signal output from the GPS antenna 9 to down-convert the RF signal into Intermediate Frequency signal (IF signal). The IF signal is then amplified, converted into a digital signal in an A/D converter to be output to the baseband processing circuit 20. Hereinafter, "receiving a GPS satellite signal" is to indicate a whole process from receiving an RF signal at the GPS antenna 9 to generating a down-converted IF signal, and "a received signal" indicates an IF signal.

The baseband processing circuit 20 is a circuit that processes (correlating etc.) an IF signal output from the RF receiving circuit 11 to acquire and extract the GPS satellite signal, so as to be able to decode data to read navigation message or time information.

Figure 10:
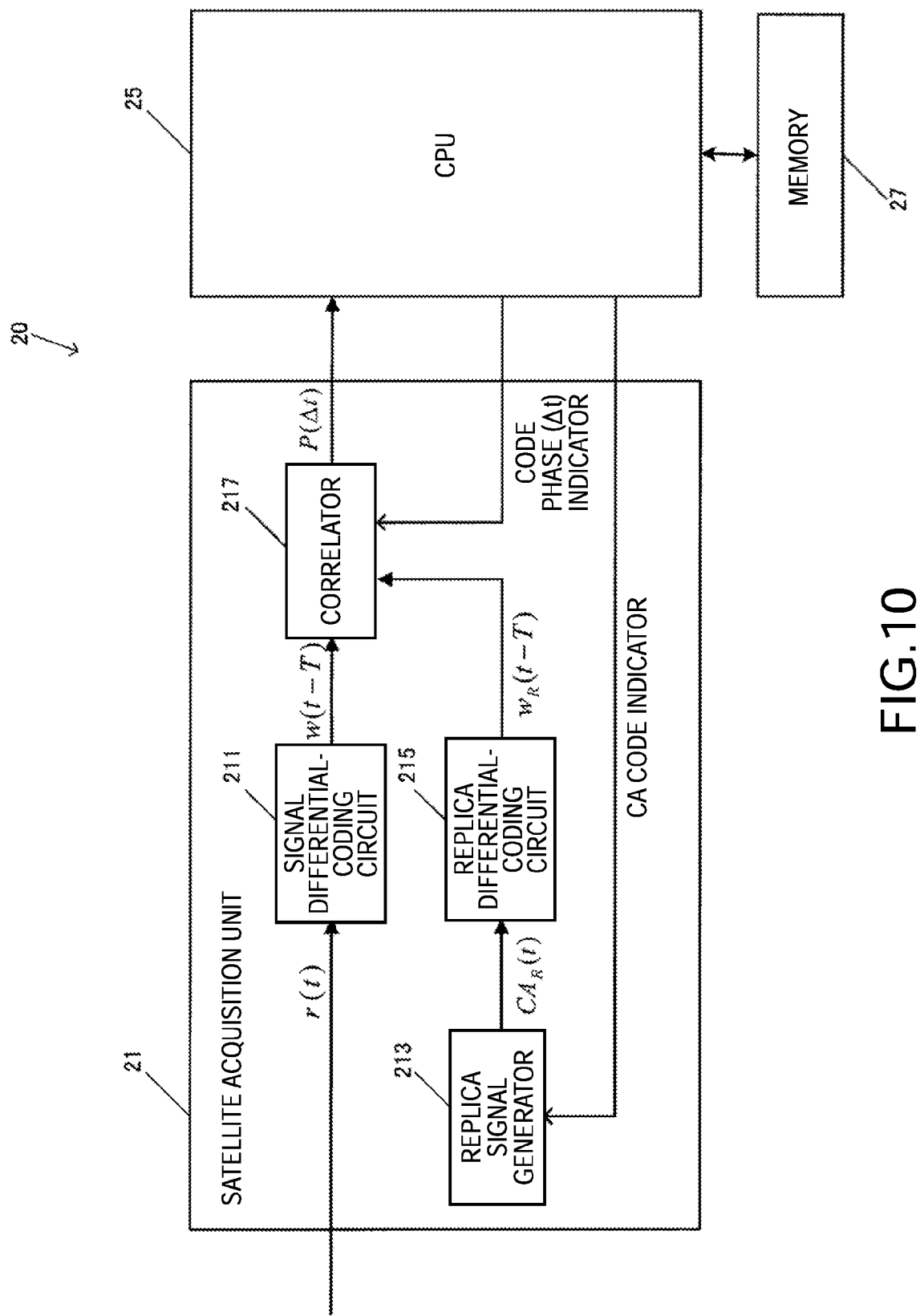
FIG. 10 is an example diagram illustrating a circuit configuration of a baseband processing circuit.

FIG. 10 shows an example circuit configuration of the baseband processing circuit 20. The baseband processing circuit 20 is configured to include a satellite acquisition unit 21, a CPU 25 and a memory 27.

The satellite acquisition unit 21 is a circuit that acquires a GPS satellite signal out of a received signal, which is an IF signal output from the RF receiving circuit 11. The satellite acquisition unit 21 is configured to include a signal differential circuit 211 (also referred to as a differential unit), a replica signal generator 213, a replica differential circuit 215 and a correlator 217.

Figure 11:
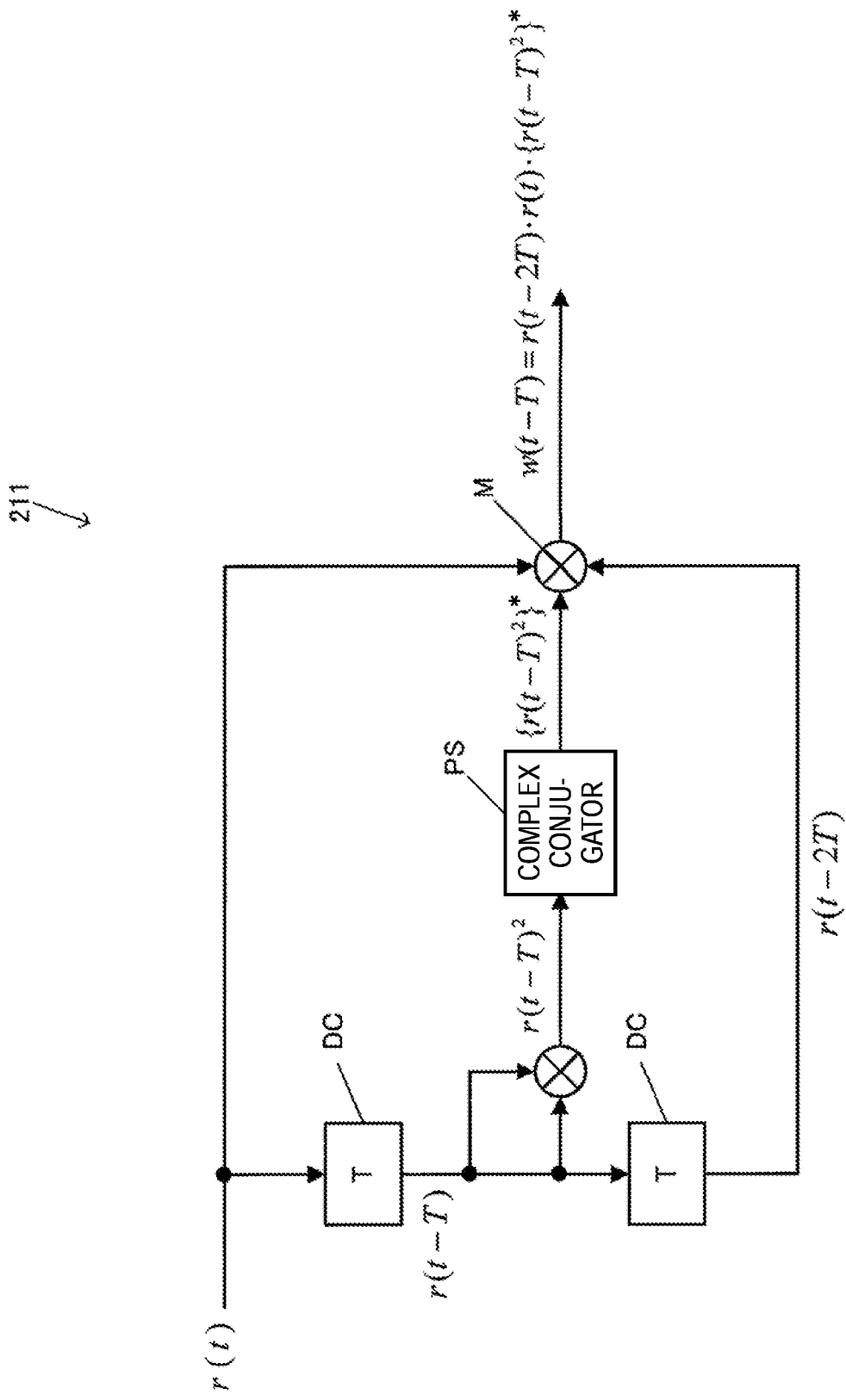
FIG. 11 is an example diagram illustrating a circuit configuration of a signal differential circuit.

FIG. 11 shows an example circuit configuration of the signal differential circuit 211. The signal differential circuit 211 is a circuit that generates a differential signal "w(t−T)" by performing a differential operation on a received signal "r(t)" input from the RF receiving circuit 11 to complete the equation (6). The differential signal may also be referred to as a differential CA code as in the description of the principle.

In the signal differential circuit 211, a block "T" is a delay circuit DC which delays an input signal by time "T" to output a delayed signal. A complex conjugator PS is a circuit that generates (e.g., calculates) complex conjugates of the input signal and is often configured to include, for example, a phase-shift circuit. Multiplying, at a multiplier M, a received signal "r(t)" (a first segment of the received signal), a squared complex conjugate "$\{r(t-T)^2\}*$" of a first delayed signal (a second segment of the received signal) which is delayed from the received signal by time T, and a second delayed signal "r(t−2T)" (a third segment of the received signal) which is delayed from the received signal by time 2T, gives a differential CA code "$w(t-T)=r(t-2T)\cdot r(t)\cdot\{r(t-T)^2\}*$", to be output to the correlator 217.

The replica signal generator 213 is a circuit that generates a signal that is a replica of a spreading code of the GPS satellite's CA code. The replica signal generator 213 generates a replica signal "$CA_R(t)$" to be output to the replica differential circuit 215. The replica signal "$CA_R(t)$" is generated according to a CA code indicator (an indicating signal of a target satellite) that is output from the CPU 25.

Figure 12:
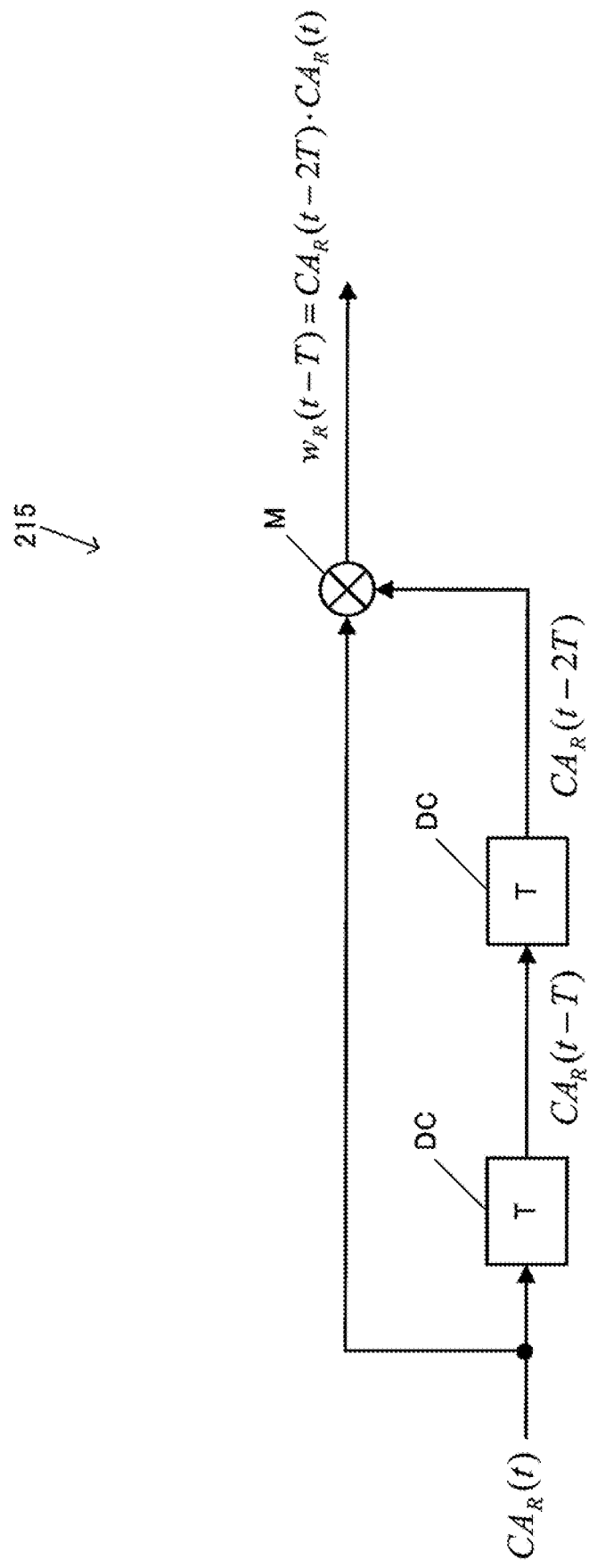
FIG. 12 is an example diagram illustrating a circuit configuration of a replica differential circuit.

FIG. 12 shows an example circuit configuration of the replica differential circuit 215. The replica differential circuit 215 is a circuit that performs a differential operation on the replica signal "$CA_R(t)$" that has been input from the replica signal generator 213 to generate a differential replica signal "$w_R(t-T)$", so as to complete the equation (7). The differential replica signal may also be referred to as a differential replica code as in the description of the principle.

In the replica differential circuit 215, a block shown with "T" is delay circuit DC, which delays a signal by time T as does the delay circuit DC in FIG. 11. Multiplying, at a multiplier M, an input replica signal "$CA_R(t)$" and a delayed signal from the replica signal by time 2T "$CA_R(t-2T)$" gives a differential replica signal "$w_R(t-T)=CA_R(t-2T)\cdot CA_R(t)$", which is then output to the correlator 217.

Referring back to FIG. 10, the correlator 217 is a correlation circuit that correlates a differential CA code "w(t)" input from the signal differential circuit 211 and a differential replica signal "$w_R(t)$" input from the replica differential circuit 215. The correlator 217 calculates a correlation (e.g., generates a signal representative of a correlation) between the codes "w(t)" and "$w_R(t+\Delta t)$" while changing code phase "$\Delta t$" of the differential replica signal "$w_R(t)$" accordingly to the code phase indicator input from the CPU 25 to output a correlation value "$P(\Delta t)$" to the CPU 25.

The CPU 25 is a processor that integrally controls each unit in the baseband circuit 20 according to various programs, such as a system program, stored in the memory 27. The CPU 25, having a function of a satellite acquisition unit, detects the code phase for each target satellite based on the correlation value "$P(\Delta t)$" output to CPU 25 from the correlator 217. This is described in greater detail below. The detection of the code phase of the satellite's code signal (e.g., the generation of the "detected code phrase" or "determined code phase") serves to acquire the satellite code signal since the timing information provided by the satellite's code signal can be related to the receiver's time clock by the value of the detected code phase. The detected code phase is utilized to calculate a pseudorange between the mobile telephone 1 and the target satellite. The calculated pseudorange is used in a positioning calculation to calculate the position of the mobile telephone 1.

The CPU 25 outputs to the replica signal generator 213 a CA code indicator that indicates a CA code, or a pseudorandom noise code number (PRN), of the target satellite, to have the replica signal generator 213 generate a replica signal "$CA_R(t)$" according to the CA code indicator. The CPU 25 outputs to the correlator 217 a code phase indicator that indicates a code phase "$(\Delta t)$" of the differential replica signal "$w_R(t)$", to have the correlator 217 calculate correlation (e.g., generate a correlation signal) using the differential replica signal "$w_R(t)$" while changing code phase "$\Delta t$".

The memory 27 is configured to include a Read Only Memory (ROM), a flash ROM and a Random Access Memory (RAM), and stores a system program for the CPU 25 to control the baseband processing circuit 20 or other programs and data that enable positioning calculations. The memory 27 also forms work area that temporarily stores data-in-process or processing results of the various processing programs or various processes executed by the CPU 25.

Referring back to FIG. 9, host CPU 30 is a processor that integrally controls each unit in the mobile telephone 1 according to various programs, such as a system program, stored in memory 80. The host CPU 30 executes processes such as displaying a position input from the baseband processing circuit 20 on the display 50, or utilizing the position information for various applications.

The operation unit 40 is an input device configured to include, a touch panel or a button switch for example, to output a signal generated by a pressed key or button to the CPU 30. Key or button presses or touches on the operation unit 40 input a request for making a telephone call, sending or receiving an electronic message, calculating a position, and etc.

The display 50 is configured to include a liquid crystal display (LCD) or the like, and displays whatever is to be displayed determined based on a display signal input from the host CPU 30. The display 50 shows a located position, time or other information.

The antenna for mobile telephone 60 is an antenna that sends or receives wireless mobile communication signals between mobile telephone and wireless stations of a communication service provider of the mobile telephone 1.

The wireless communication circuit for mobile telephone 70 is a communication circuit configured to include an RF converter and a baseband processing circuit. The wireless communication circuit for mobile telephone 70 modulates or demodulates wireless signals for mobile telephone to realize a telephone conversation or sending/receiving of an electronic message.

The memory 80 is a memory device that stores, for example a system program for the host CPU 30 to control the mobile telephone 1 or other programs and data that enable positioning calculations.

(2) Process Flow

Figure 13:
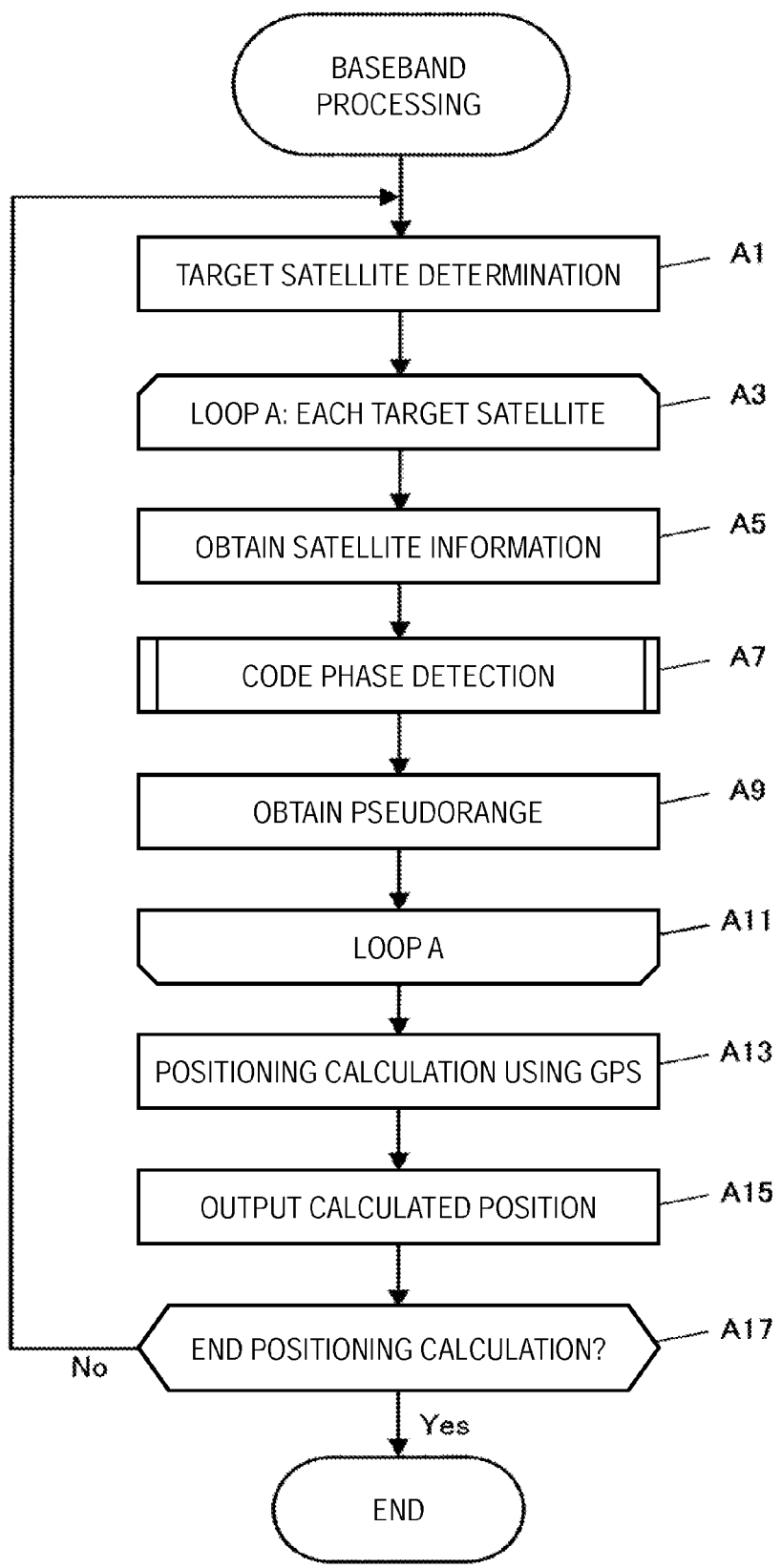
FIG. 13 is a flowchart of a baseband processing.

FIG. 13 is a flowchart that shows a baseband process executed by the CPU 25 of the baseband processing circuit 20. Although some details are omitted, assumed herein is that, while the baseband process below is being executed, the GPS antenna 9 is receiving an RF signal, the RF receiving circuit is down-converting the RF signal into an IF signal, and the IF signal is being output to the baseband processing circuit 20.

Firstly, the CPU 25 determines a target satellite (Step A1). Specifically, the CPU 25 determines target GPS satellites by determining satellites that are in view of a given location at a time provided by a clock (not shown) using satellite orbital data such as the almanac or the ephemeris. If it is a first positioning calculation since the last start up of the GPS receiving device, the given location may be, for example, a location obtained through an assist server in a base station that communicates with the mobile telephone 1. If it is not a first positioning calculation since the last start up of the GPS receiving device, then a given location may be set to be the position obtained in the last positioning calculation.

Then the CPU 25 executes Loop A (Steps A3 to A11) for each of the target satellites determined in Step A1. In Loop A, the CPU 25 calculates satellite information including a location, a velocity, and a moving direction of the target satellites using the satellite orbital data (Step A5). Then the CPU 25 executes a process for detecting a code phase (Step A7).

Figure 14:
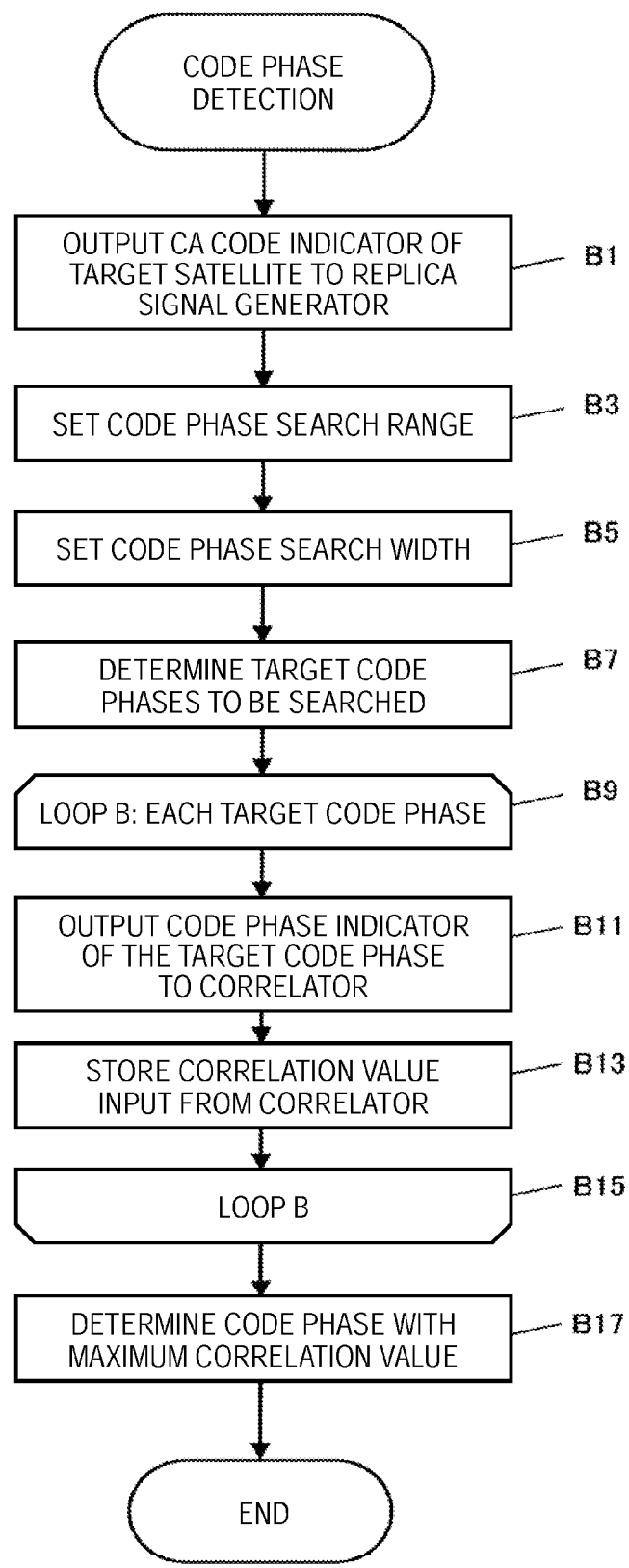
FIG. 14 is a flowchart of a code phase detection.

FIG. 14 is a flowchart that shows a code phase detection process. Firstly, the CPU 25 outputs to the replica signal generator 213 a CA code indicator for the target satellite (Step B1). The CPU 25 sets a code phase search range and a code phase search width (Steps B3, B5). The CPU 25 determines code phases to be searched (hereinafter referred to as "searched code phases") based on the code phase search range and the code phase search width (Step B7).

Then the CPU 25 executes Loop B for each of the searched code phases set in Step B7 (Steps B9 to B15). In Loop B, the CPU 25 outputs to the correlator 217 a code phase indicator of the searched code phases "Δt" (Step B11). After Step B11 is executed, the correlator 217 calculates correlation (e.g., generates correlation signals) according to the principle described in FIGS. 1 to 3 to output correlation value "P(Δt)" to the CPU 25. After the correlation value "P(Δt)" is input from the correlator 217, the CPU 25 stores the correlation value "P(Δt)" in the memory 27 (Step B13). The CPU 25 then moves on to the next searched code phase.

Having completed Steps B11 to B13 for all the searched code phases, the CPU 25 completes Loop B (Step B15). The CPU 25 determines one of the code phases "Δt", in which the correlation value "P(Δt)" stored in the memory 27 shows the maximum value, to be the detected code phase (Step B17), or also called the "determined code phase." The CPU 25 ends the code phase detection process.

Referring back to the baseband process in FIG. 13, after the code phase detection is executed, the CPU 25 calculates a pseudorange between the target satellite and the mobile telephone 1 using the satellite information obtained in Step A5 and the code phase detected in Step A7 (Step A9). The integer part of the pseudorange is obtainable using a satellite location and the last calculated position by the GPS device, and the fractional part is obtainable based on the code phase. The CPU 25 moves on to acquiring another target satellite after the pseudorange is calculated.

The CPU 25 ends Loop A (Step A11) after having executed the processes of Steps A5 to A9 for all the target satellites. The CPU 25 then calculates the position of the mobile telephone 1 (Step A13) by executing a GPS positioning calculation using the pseudoranges calculated in Step A9 for each of the target satellites. Further details and description of the positioning calculations using pseudoranges are omitted here because this method is well known and widely utilized in positioning calculations. As such, it is well within the skill of the ordinary person in the art to implement this calculation method without undue experimentation.

Then the CPU 25 outputs the position calculated in the GPS positioning calculation to the host CPU 30 (Step A15). The CPU 25 determines whether the positioning calculation is to end or not (Step A17). If the positioning calculation is determined not to end (NO in Step A17), the process returns to Step A1. If the positioning calculation is determined to end (YES in Step A17), then the baseband process ends.

(3) Effect and Advantage

In the satellite acquisition unit 21 in the baseband processing circuit 20, a GPS satellite signal from a GPS satellite is received, the received signal "r(t)" is processed with a differential operation in the signal differential circuit 211, and then the differential CA code "w(t−T)" is generated. A replica signal "$CA_R(t)$" generated by the replica signal generator 213 is processed with a differential operation in the replica differential circuit 215, and then the differential replica signal "$w_R(t-T)$" is generated. The differential CA code "w(t−T)" and the differential replica signal "$w_R(t-T)$" are correlated in the correlator 217, and correlation value "P(Δt)" is output to the CPU 25. The CPU 25 acquires a GPS satellite signal based on the correlation value "P(Δt)".

A differential signal is generated by performing a differential operation on a CA code representing a spreading code of a GPS satellite signal. The differential signal is generable using a received signal and a delayed signal, which is the received signal delayed by a selected delay time, regardless of the frequency of the received signal. Thus, by correlating the differential signal and the differential replica signal, and acquiring the GPS satellite signal based on the correlation values obtained, the GPS satellite signal is able to be acquired within a shorter time period without any correlation calculation in the frequency direction.

To put in another way, the correlation values obtained by correlating the differential signal and the differential replica signal correspond to the correlation values obtainable by searching the received signal in the frequency direction. A search in the frequency direction is no longer necessary on an attempt to acquire a satellite signal, and therefore, the time spent in searching the signal in the frequency direction is no longer needed. A search of a signal requires only the time required for a search in the code phase direction.

The inventor has experimented on the time it takes to acquire a GPS satellite signal using the method of the invention, as well as a conventional method which is to conduct a frequency search (correlation calculation in the frequency direction) for 20 frequencies. As a result, the conventional method takes 2.8 seconds as opposed to 0.12 seconds with the method of the invention. The method of the invention takes 1/20 of the time required in the conventional method to acquire the GPS satellite signal, and the result shows that a satellite signal is acquired without a frequency search for 20 frequencies. The inventor has also checked the accuracy in detecting the code phase in the method of the invention, and found an improved accuracy in detecting the code phase compared to the conventional method.

2-2. Second Embodiment

The second embodiment is an application of the above described principle "1-2. A method for predicting a CA code from a differential CA code". The functions and process flow of the function blocks other than the satellite acquisition unit are common to the mobile telephone 1 in the first embodiment. The different function block from the first embodiment, the satellite acquisition unit, is hereinafter described.

(1) Configuration

Figure 15:
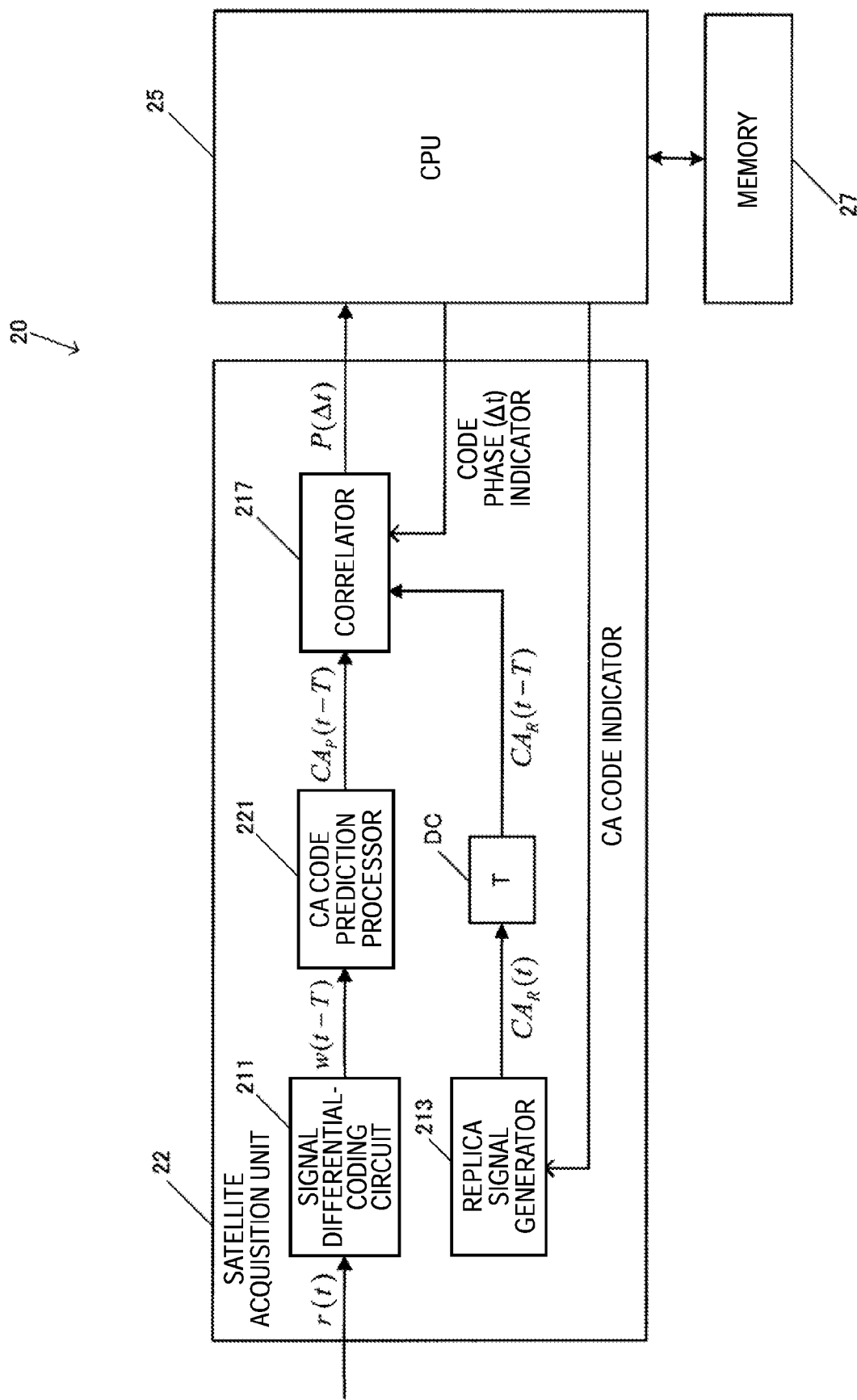
FIG. 15 is an example diagram illustrating a circuit configuration of a satellite acquisition unit in a modified embodiment.

FIG. 15 is an example circuit configuration of satellite acquisition unit 22 in the second embodiment. The same elements as the satellite acquisition unit 21 in the FIG. 10 are given the same reference numbers and detail description thereof is omitted.

The satellite acquisition unit 22 is configured to include signal differential circuit 211, CA code prediction processor 221, replica signal generator 213, correlator 217 and delay circuit DC.

CA code prediction processor 221 uses a differential CA code "w(t−T)" output from signal differential circuit 211 to predict the CA code according to the principle described in FIGS. 4 to 8. A predicted CA code signal (also referred to as a predicted code) "$CA_R(t-T)$" is generated and output to the correlator 217.

A replica signal "$CA_R(t)$" generated by the replica signal generator 213 is delayed by 1 clock in the delay circuit DC and output to the correlator 217. The correlator 217 correlates the predicted CA code signal "$CA_P(t-T)$" input from the CA code prediction processor 221 and a replica signal "$CA_R(t-T)$" input from the replica signal generator 213. The signals "$CA_P(t-T)$" and "$CA_R(t-T+\Delta t)$" are correlated while changing code phase "$\Delta t$" of the replica signal "$CA_R(t-T)$" according to a code phase indicator from the CPU 25. The correlation value "$P(\Delta t)$" is output to the CPU 25.

(2) Effect and Advantage

In the second embodiment, a CA code of a received signal "$CA(t)$" is predicted in CA code prediction processor 221. The predicted CA code signal "$CA_P(t-T)$" and a replica signal "$CA_R(t-T)$" are correlated in correlator 217. Using the prediction process according to the above described principle enables an accurate prediction of the CA code "$CA(t)$". Thus, the correlation values obtained in the correlation process are reliable, and a more-reliable acquisition of a GPS satellite signal may be achieved.

3. MODIFIED EMBODIMENTS

3-1. Applications

The embodiments described above focus on examples of GPS satellite acquisition, but the invention is also applicable to other receiving devices that receive signals other than GPS satellite signals. The invention is applicable to any signal receiver that receives a signal spread-modulated by a predetermined spreading code. If such receiver requires a frequency search on a signal acquisition attempt, it would be highly effective to apply the invention.

3-2. Electronic Devices

The embodiments described above focus on a mobile telephone, which is one of electronic devices, but the invention may be applied to various other electronic devices as well. Examples of various other electronic devices are vehicle navigation systems, mobile/handheld navigation systems, personal computers, personal digital assistants (PDA) or wrist watches.

3-3. Satellite Positioning Systems

The embodiments described above use GPS as a satellite positioning system, but other satellite positioning systems such as Wide Area Augmentation System (WAAS), Quasi Zenith Satellite System (QZSS), GLObal Navigation Satellite System (GLONASS), or GALILEO may also be used.

3-4. Parallelization of Correlators

In the first embodiment, a correlation process by the correlator 217 is described to serially correlate the differential replica signal "$w_R(t)$" while changing code phase "$\Delta t$" according to the code phase indicator from the CPU 25. The circuit configuration may be changed to execute a correlation calculation between the differential signal "$w(t)$" and the differential replica signal "$w_R(t)$" in parallel.

Figure 16:
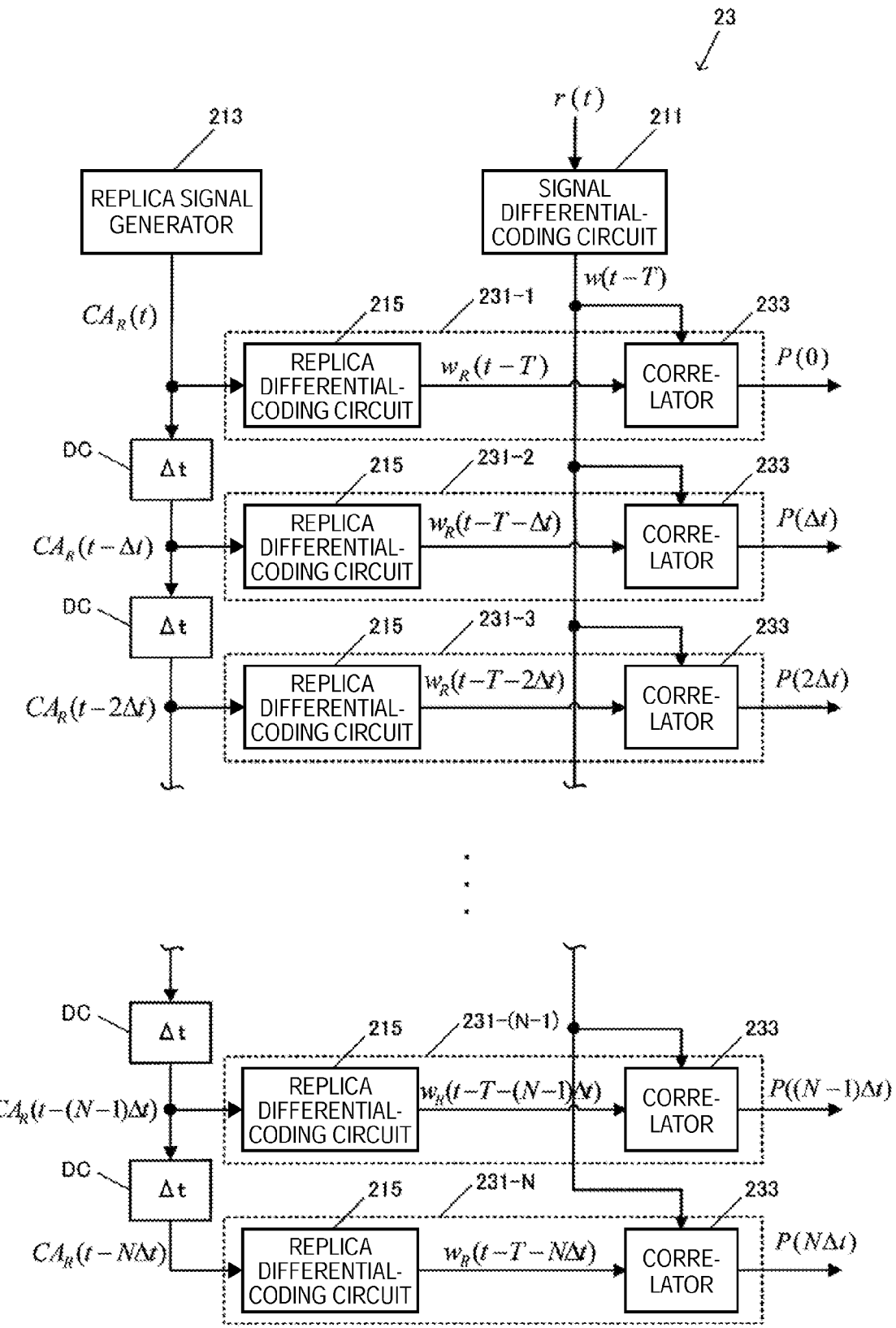
FIG. 16 is an example diagram illustrating a circuit configuration of a satellite acquisition unit in another modified embodiment.

FIG. 16 is an example circuit configuration of satellite acquisition unit 23 in a modified embodiment. The same elements as the satellite acquisition unit 21 in the FIG. 10 are given the same reference numbers and detail description thereof is omitted. The description given hereinafter is centered around the different elements from the satellite acquisition unit 21.

In the satellite acquisition unit 23, a replica signal "$CA_R(t)$" generated by the replica signal generator 213 is delayed by a code phase "$\Delta t$" in the delay circuit DC, and each delayed signal is input to a different stage. N number of stages of satellite signal processing circuit, namely, first satellite signal processing circuit 231-1 to Nth satellite signal processing circuit 231-N are configured so that the delayed replica signal "$CA_R(t-n-\Delta t)$" on an "nth stage (n=1, 2, ... N)" delayed in the delay circuit DC is input to an nth satellite signal processing circuit 231-n.

Each satellite signal processing circuit 231 is configured to include replica differential circuit 215 and correlator 233. A replica signal "$CA_R(t-n-\Delta t)$" input to the nth satellite signal processing circuit 231-n is converted to a differential replica signal "$w_R(t-T-n-\Delta t)$" in replica differential circuit 215. The correlator 233 correlates between a differential signal "$w(t-T)$" and the differential replica signal "$w_R(t-T-n-\Delta t)$" to output correlation value "$P(n-\Delta t)$" to the CPU 25.

3-5. Generating a Differential Signal

The embodiments above are described to generate a differential signal "$w(t)$" using a received signal "$r(t)$", a first delay signal delayed by 1 clock from the received signal "$r(t-T)$", and a second delay signal delayed by 2 clocks from the received signal "$r(t-2T)$", using a clock "$t$" as a basis. A plurality of differential signals "$w(t)$" are also generable by making a delaying clock "$T$" variable.

In principle, a differential signal "$w(t, m)$" is generated (e.g., calculated) according to the equations (10) and (11) using a first signal "$r(t-m \cdot T)$" and a second signal "$r(t+m \cdot T)$", where "$m$" is an integer. Just like the time period T, the time period $m \cdot T$ is a selectable time period.

$$r(t-m \cdot T) \cdot r(t+m \cdot T) = \\ CA(t-m \cdot T) \cdot e^{i\omega(t-m \cdot T)} \cdot CA(t+m \cdot T) \cdot e^{i\omega(t+m \cdot T)} = \\ CA(t-m \cdot T) \cdot CA(t+m \cdot T) \cdot e^{2i\omega t} \quad (10)$$

$$w(t, m) = CA(t-m \cdot T) \cdot CA(t+m \cdot T) = \\ r(t-m \cdot T) \cdot r(t+m \cdot T) \cdot e^{-2i\omega t} = r(t-m \cdot T) \cdot r(t+m \cdot T) \cdot \{r(t)^2\}^* \quad (11)$$

Similarly, a differential replica signal "$w_R(t, m)$" is also generated (e.g., calculated) according to the equation (12).

$$w_R(t,m) = CA_R(t-m \cdot T) \cdot CA_R(t+m \cdot T) \quad (12)$$

In this case, the differential signal "$w(t, m)$" and the differential replica signal "$w_R(t+\Delta t, m)$" are used to generate (e.g., calculate) a correlation value "$P(\Delta t, m)$" according to the equation (13).

$$P(\Delta t, m) = \left(\sum_t g(t, m)\right)^2 = \left(\sum_t w(t, m) \cdot w_R(t + \Delta t, m)\right)^2 \\ = \left(\sum_t CA(t-m \cdot T) \cdot CA(t+m \cdot T) \cdot \\ CA_R(t-m \cdot T+\Delta t) \cdot CA_R(t+m \cdot T+\Delta t)\right)^2 \quad (13)$$

After having generated correlation values ($P(\Delta t, m)$) for a plurality of "$m$"s, a combined correlation value "$P_A(\Delta t)$" is generated (e.g., calculated) according to the equation (14).

$$P_A(\Delta t) = \left(\sum_m P(\Delta t, m)\right)^2 \quad (14)$$

Generating a combined correlation value "$P_A(\Delta t)$" according to the equation (14) while changing code phase "$\Delta t$" of the differential replica signal "$w_R(t, m)$" and detecting the code phase "$\Delta t$" in which the combined correlation value shows the maximum value gives the detect code phase (also called "determined code phrase").

Figure 17:
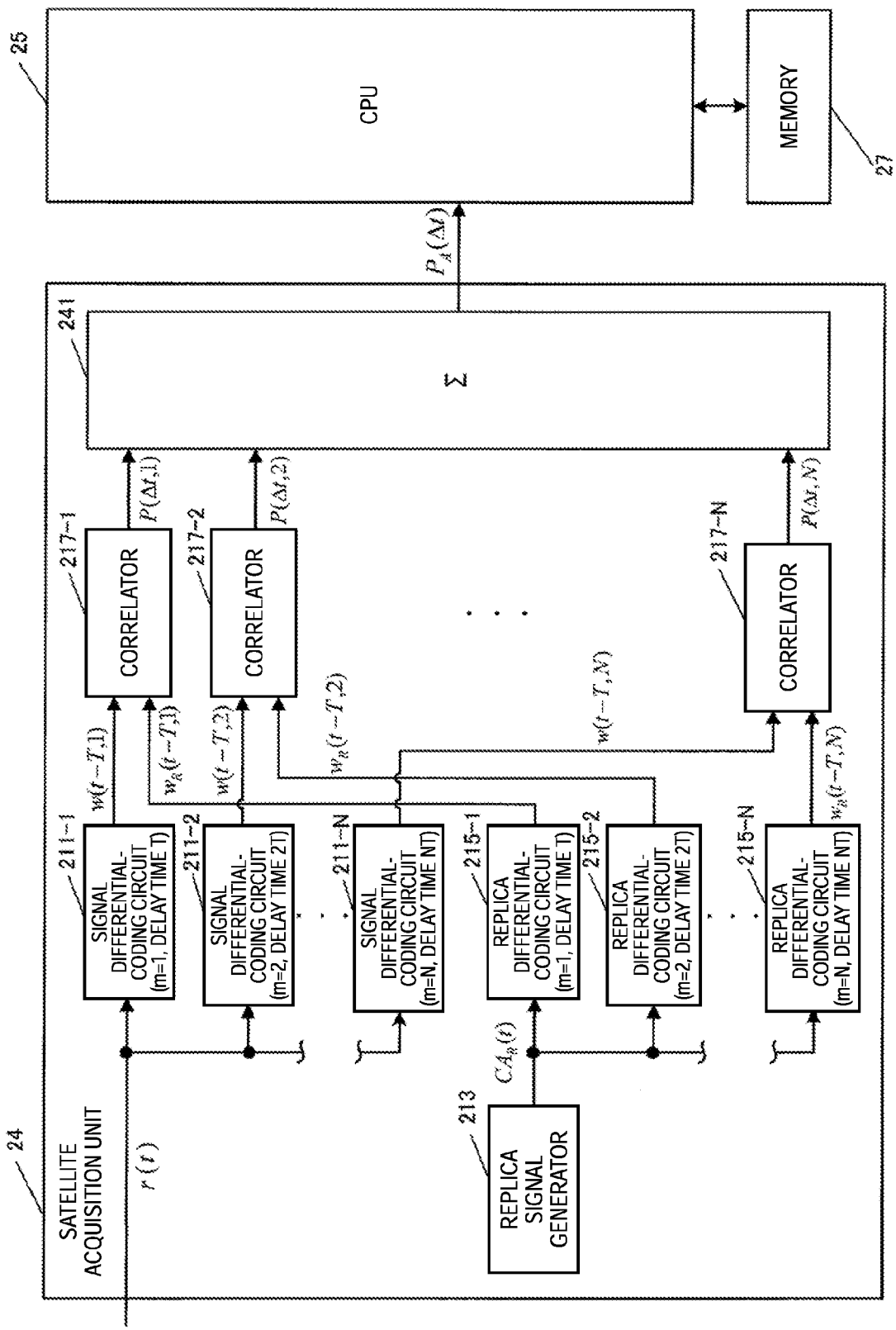
FIG. 17 is an example diagram illustrating a circuit configuration of a satellite acquisition unit in another modified embodiment.

FIG. 17 is an example circuit configuration of satellite acquisition unit 24 in the modified embodiment. The same elements as the satellite acquisition unit 21 in the FIG. 10 are given the same reference numbers and detail description thereof is omitted. For simplicity, a CA code indicator from CPU 25 to replica signal generator 213 and a code phase indicator from CPU 25 to correlator 217 are not shown.

An N number of signal differential circuits 211-1 to 211-N are provided in the satellite acquisition unit 24. The signal differential circuits 211-1 to 211-N are differential circuits respectively corresponding to the integer "m=1 to N" described above. The delay time at each delay circuits DC of the circuits 211-1 to 211-N go from T to NT, respectively. Similarly for replica differential circuit, an N number of replica signal differential circuits 215-1 to 215-N are provided. Correlator 217-1 to 217-N are respectively provided for differential circuits.

A received signal "r(t)" is input to signal differential circuit 211-1 to 211-N to form an N number of differential signals "w(t–T, 1)" to "w(t–T, N)", which are then input respectively to correlators 217-1 to 217-N. A replica signal "$CA_R(t)$" is input to replica differential circuit 215-1 to 215-N to form an N number of differential replica signals "$w_R(t–T, 1)$" to "$w_R(t–T, N)$", which are then input respectively to correlators 217-1 to 217-N.

In each correlator 217-1 to 217-N, correlation values "$P(\Delta t, 1)$" to "$P(\Delta t, N)$" are obtained and output to combining unit 241. In the combining unit 241, the combined correlation value "$P_A(\Delta t)$" is obtained by combining correlation values "$P(\Delta t, 1)$" to "$P(\Delta t, N)$", which are output to the CPU 25.

As described above, a plurality of differential signals "w(t–T, m)" based on a plurality of delayed signals delayed by differing time periods are generated and combined among to obtain a plurality of correlation values "$P(\Delta t, m)$" that are independent from each other. Using the combined correlation value "$P_A(\Delta t)$" obtained by combining these correlation values for detecting the code phase may provide higher reliability in acquiring the GPS satellite signal.

In the modified embodiment above, a plurality of differential signals "w(t, m)" are generated by delaying the received signal by clock "T" multiplied by "m=1 to N", but the delay time in each of the differential circuit may be set variably. Specifically, in signal differential circuit 211-1 to 211-N, each differential signal "w(t, Tm)" may be generated by setting a desired delay time "T1" to "TN" in each of the delay circuits DC. The same applies for replica differential circuit 215-1 to 215-N.

3-6. Differential Operation on a Signal (1)

In the embodiments described above, a differential operation on a received signal is performed using an electrical circuit, but the same can be achieved using software as digital signal processing. The same is true for performing a differential operation on a replica signal.

3-7. Differential Operation on a Signal (2)

In the embodiments described above, a differential operation on a received signal is performed by delaying a received signal in signal differential circuit 211, but the same can be achieved by storing a received signal input from RF receiving circuit 11 in a sample memory, and reading the received signal "r(t)" (a first segment of the received signal), a segment delayed by "T" with respect to the received signal "r(t–T)" (a second segment of the received signal) and a segment delayed by "2T" with respect to the received signal "r(t–2T)" (a third segment of the received signal) for differential operation. Else, any other method that obtains an "r(t)", an "r(t–T)" having a time difference of "T" with respect to "r(t)", and an "r(t–2T)" having a time difference of "2T" with respect to "r(t)" is applicable.

What is claimed is:

1. A method for acquiring a satellite signal received from a positioning satellite, the method comprising:

generating a complex-conjugate of a squared second segment of the satellite signal, the second segment having a time difference T with respect to a first segment of the satellite signal;

multiplying the first segment, the generated complex-conjugate and a third segment of the satellite signal to generate a first differential code of a spreading code of the positioning satellite, the third segment having a time difference 2T with respect to the first segment;

obtaining a first correlation value using the first differential code and a replica of the spreading code; and acquiring the satellite signal using the first correlation value.

2. The method according to claim 1, the method further comprising:

multiplying the first segment, a fourth segment having a time difference T' with respect to the first segment and a fifth segment having a time difference 2T' with respect to the first segment to generate a second differential code of the spreading code, obtaining a second correlation value using the second differential code and the replica of the spreading code; and acquiring the satellite signal using the first correlation value and the second correlation value.

3. The method according to claim 1, wherein obtaining the first correlation value includes multiplying a first segment of the replica code and a second segment of the replica code to generate a differential replica, the second segment of the replica code having the time difference 2T with respect to the first segment of the replica code, and correlating the first differential code and the differential replica.

4. The method according to claim 1, wherein obtaining the correlation value includes predicting a predicted spreading code based on the first differential code, and correlating the predicted spreading code and the replica code.

5. The method according to claim 1, further comprising:

searching a peak correlation by changing a phase of the satellite signal, wherein the acquiring the satellite signal includes acquiring the satellite signal based on the peak correlation for the phase, without a search for a peak correlation by changing a frequency.

6. A satellite signal receiving device comprising:
a receiver that receives a satellite signal from a positioning satellite;
a differential unit that generates a complex-conjugate of a squared second segment of the satellite signal and multiplies a first segment of the satellite signal, the generatated complex-conjugate and a third segment of the satellite signal to generate a first differential code of a spreading code of the positioning satellite;
a correlator that obtains a first correlation value using the first differential code and a replica code of the spreading code; and
an acquisition unit that acquires the satellite signal using the first correlation value,
wherein the second segment has a time difference T with respect to the first segment, the third segment has a time difference 2T with respect to the first segment.

7. The satellite signal receiving device according to claim 6, the device further comprising:
the differential unit that multiplies the first segment, a fourth segment having a time difference T' with respect to the first segment, and a fifth segment having a time difference 2T' with respect to the first segment to generate a second differential code of the spreading code, T and T' being different;
the correlator that obtains a second correlation value using the second differential code and the replica code; and
the acquisition unit that acquires the satellite signal using the first correlation value and the second correlation value.

8. The satellite signal receiving device according to claim 6, wherein the obtaining the first correlation values of the correlator includes
multiplying a first segment of the replica code and a second segment of the replica code to generate a differential replica, the second segment of the replica code having the time difference 2T with respect to the first segment of the replica code, and
correlating the first differential code and the differential replica.

9. The satellite signal receiving device according to claim 6, wherein the correlation value of the correlator includes
predicting a predicted spreading code based on the first differential code, and
correlating the predicted spreading code and the replica code.

10. The satellite signal receiving device according to claim 6, the device further comprising:
a searching unit that searches a peak correlation by changing a phase of the satellite signal, and
wherein the acquiring the satellite signal based of the acquisition unit includes acquiring the satellite signal base on the peak correlation for the phase, without a search for a peak correlation by changing a frequency.

* * * * *